(12) United States Patent
Uno et al.

(10) Patent No.: US 12,436,074 B2
(45) Date of Patent: Oct. 7, 2025

(54) METHOD FOR SEARCHING FOR STATISTICS CORRELATED WITH STRENGTH OF PILLAR-SHAPED HONEYCOMB FORMED BODY AFTER FIRING, AND METHOD FOR PREDICTING WHETHER OR NOT PILLAR-SHAPED HONEYCOMB FORMED BODY AFTER FIRING HAVING PREDETERMINED DESIGN SPECIFICATIONS CAN BE OBTAINED

(71) Applicant: NGK Insulators, Ltd., Nagoya (JP)

(72) Inventors: Shota Uno, Nagoya (JP); Hiroshi Ninomiya, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 385 days.

(21) Appl. No.: 18/067,814

(22) Filed: Dec. 19, 2022

(65) Prior Publication Data

US 2023/0251172 A1    Aug. 10, 2023

(30) Foreign Application Priority Data

Feb. 9, 2022    (JP) .................................. 2022-019081

(51) Int. Cl.
*G01N 33/38*    (2006.01)
*G01N 3/00*    (2006.01)
(Continued)

(52) U.S. Cl.
CPC .............. *G01N 3/62* (2013.01); *G01N 3/068* (2013.01); *G01N 2203/021* (2013.01); *G01N 2203/0266* (2013.01); *G01N 2203/0647* (2013.01)

(58) Field of Classification Search
CPC ..................................................... G01N 33/388
See application file for complete search history.

(56) References Cited

U.S. PATENT DOCUMENTS

| | | | |
|---|---|---|---|
| 6,405,602 B1 | 6/2002 | Itou et al. | |
| 2011/0116704 A1* | 5/2011 | Zoeller, III | G01N 21/95692 382/141 |

(Continued)

FOREIGN PATENT DOCUMENTS

| | | |
|---|---|---|
| EP | 2 913 666 A2 | 9/2015 |
| JP | 2001-041867 A | 2/2001 |

(Continued)

*Primary Examiner* — Herbert K Roberts
(74) *Attorney, Agent, or Firm* — BURR PATENT LAW, PLLC

(57) ABSTRACT

A method for searching for statistics correlated with a strength of a pillar-shaped honeycomb formed body after firing having predetermined design specifications including a step of measuring two or more parameters for 90% or more of the polygonal cells excluding partial cells at the outermost periphery, and calculating two or more statistics for each parameter measured; a step of firing each of the plurality of pillar-shaped honeycomb formed bodies before firing under predetermined conditions to prepare a plurality of pillar-shaped honeycomb formed bodies after firing; a step of evaluating a correlation between the two or more statistics and the strength of the plurality of pillar-shaped honeycomb formed bodies after firing; and a step of determining a statistic having the highest correlation with the strength of the pillar-shaped honeycomb formed bodies after firing having the predetermined design specifications from among the two or more statistics.

10 Claims, 6 Drawing Sheets

(51) Int. Cl.
    *G01N 3/06*     (2006.01)
    *G01N 3/62*     (2006.01)

(56) References Cited

U.S. PATENT DOCUMENTS

| | | |
|---|---|---|
| 2013/0212051 A1* | 8/2013 | Stephens ............... G06T 7/0004 |
| | | 382/152 |
| 2017/0153169 A1 | 6/2017 | Iida et al. |
| 2018/0150618 A1* | 5/2018 | Nevarez .................. C04B 35/80 |
| 2019/0026414 A1 | 1/2019 | Nickerson et al. |
| 2021/0279849 A1 | 9/2021 | Nakamura et al. |

FOREIGN PATENT DOCUMENTS

| | | | |
|---|---|---|---|
| JP | 2015-161543 A | 9/2015 | |
| JP | 2017-096879 A | 6/2017 | |
| JP | 2019-512079 A | 5/2019 | |
| JP | 2021-139856 A | 9/2021 | |

* cited by examiner

Exhaust gas

Exhaust gas

METHOD FOR SEARCHING FOR STATISTICS CORRELATED WITH STRENGTH OF PILLAR-SHAPED HONEYCOMB FORMED BODY AFTER FIRING, AND METHOD FOR PREDICTING WHETHER OR NOT PILLAR-SHAPED HONEYCOMB FORMED BODY AFTER FIRING HAVING PREDETERMINED DESIGN SPECIFICATIONS CAN BE OBTAINED

CROSS REFERENCE TO RELATED APPLICATIONS

The present invention claims the benefit of priority to Japanese Patent Application No. 2022-019081 filed on Feb. 9, 2022 with the Japanese Patent Office, the entire contents of which are incorporated herein by reference in its entirety.

FIELD OF THE INVENTION

In one embodiment, the present invention relates to a method for searching for statistics correlated with the strength of a pillar-shaped honeycomb formed body after firing. Further, in another embodiment, the present invention relates to a method for predicting whether or not a pillar-shaped honeycomb formed body after firing having predetermined design specifications can be obtained.

BACKGROUND OF THE INVENTION

In various fields such as automobiles, chemistry, electric power, steel, and the like, pillar-shaped honeycomb structures made of ceramics, which have excellent heat resistance and corrosion resistance, are adopted as catalyst carriers or filters used for environmental measures and recovery of specific materials. A pillar-shaped honeycomb structure has an outer peripheral sidewall, and partition walls disposed on the inner peripheral side of the outer peripheral sidewall and partitioning a plurality of cells extending from a first end surface to a second end surface. In general, a pillar-shaped honeycomb structure is produced through a process of mixing and kneading a ceramic raw material powder, a dispersion medium, a binder, a pore-forming agent, and the like to prepare a green body, which is then formed into a predetermined shape to obtain a pillar-shaped honeycomb formed body, and then firing it.

A Pillar-shaped honeycomb structure requires sufficient mechanical strength to withstand impact and thermal loads. In particular, a pillar-shaped honeycomb structure used as a filter or a catalyst carrier for vehicles must have sufficient mechanical strength so that it can be placed in a metal housing during a process called "canning".

One of the indicators for the mechanical strength of a pillar-shaped honeycomb structure is the isostatic breaking strength. In the measurement of the isostatic breaking strength of a pillar-shaped honeycomb structure, a test is conducted by immersing the pillar-shaped honeycomb structure in water in a pressure vessel and applying isotropic pressure to the pillar-shaped honeycomb structure by gradually increasing the water pressure. As the water pressure in the pressure vessel gradually increases, the partition walls or outer peripheral side walls of the pillar-shaped honeycomb structure eventually break. The pressure value (breaking strength) at which breakage occurs is the isostatic breaking strength.

However, when the isostatic breaking strength is measured, it takes time to set the test sample in the pressure vessel and apply pressure. Also, the measurement of the isostatic breaking strength causes damage to the pillar-shaped honeycomb structure. Therefore, it is impractical to directly measure the isostatic breaking strength for the quality inspection of the pillar-shaped honeycomb structure. Under these circumstances, by now, there have been proposed methods for easily conducting strength inspection of a pillar-shaped honeycomb structure.

For example, in Japanese Patent Application Publication No. 2017-96879 (Patent Literature 1) and Japanese Patent Application Publication No. 2001-41867 (Patent Literature 2), there are proposed simple breaking strength test methods using an elastic body that can shorten the measurement time.

Japanese Patent Application Publication No. 2019-512079 (Patent Literature 3) discloses a non-contact method for characterizing the isostatic breaking strength of a ceramic article, comprising a step of recording a digital image of a web of a ceramic article having the web, a step of forming a 2D representation of the ceramic article based on the digital image, a step of simulating a selected amount of isostatic pressure applied to the 2D representation to identify the maximum stress value within the 2D representation of the web, and determining the isostatic breaking strength of the ceramic article using the maximum stress value.

Moreover, although not an invention aimed at inspecting the strength of a pillar-shaped honeycomb structure, Japanese Patent Application Publication No. 2015-161543 (Patent Literature 4) proposes to measure the size of an inscribed circle inscribed in partition walls only for a predetermined portion of cells using an image analyzer, for the purpose of inspecting cell deformation defects in a ceramic honeycomb structure in a short time.

Japanese Patent Application Publication No. 2021-139856 (Patent Literature 5) discloses a method for inspecting a pillar-shaped honeycomb formed body before or after firing, which can be performed non-destructively and can replace strength inspection, based on the findings that the number of cells having abnormally large openings among a plurality of cells of a pillar-shaped ceramic formed body before or after firing shows a significant correlation with the strength of the pillar-shaped honeycomb formed body after firing.

PRIOR ART

Patent Literature

[Patent Literature 1] Japanese Patent Application Publication No. 2017-96879
[Patent Literature 2] Japanese Patent Application Publication No. 2001-41867
[Patent Literature 3] Japanese Patent Application Publication No. 2019-512079
[Patent Literature 4] Japanese Patent Application Publication No. 2015-161543
[Patent Literature 5] Japanese Patent Application Publication No. 2021-139856

SUMMARY OF THE INVENTION

Although the test methods described in Patent Literatures 1 and 2 do not lead to breakage, the strength inspection is performed by actually applying pressure to a pillar-shaped honeycomb structure, so the amount of work required for the inspection is still high. and the inspection time tends to be long. Moreover, there is also a possibility of giving damage to the product. Patent Literatures 3 discloses the method for predicting the isostatic breaking strength without contact, but it requires a complicated simulation and its prediction accuracy is unknown.

In Patent Literatures 4, by inspecting the presence or absence of deformation defects in a portion of the cells of a pillar-shaped honeycomb structure using an image analyzer, the percentage of cells with cell deformation defects among the measured cells is calculated. However, it is unclear how the deformation defects of a portion of cells are related to the strength of the pillar-shaped honeycomb structure.

In Patent Literatures 5, there is performed a step of measuring the opening sizes of multiple cells of a pillar-shaped honeycomb formed body before firing, identifying abnormal cells having an opening whose size deviates from a predetermined allowable range from among a plurality of cells based on the measurement results, and counting the number of abnormal cells. However, in the inspection method described in Patent Literatures 5, it is necessary to set a criterion for judging whether each cell is an abnormal cell or not, but there is a possibility that the inspection of the pillar-shaped honeycomb formed body can be carried out by a method other than the method of determining the presence or absence of an abnormal cell individually. In addition, depending on the design specifications of the pillar-shaped honeycomb formed body such as size, shape, cell structure, and material, there is still a possibility that a better method than the inspection method described in Patent Literatures 5 will be discovered.

The present invention has been made in view of the above circumstances, and in one embodiment, an object of the present invention is to provide a method for searching for statistics of a pillar-shaped honeycomb formed body before firing that can be measured non-destructively and correlated with the strength of the pillar-shaped honeycomb formed body after firing. Further, in another embodiment, an object of the present invention is to provide a method for predicting whether or not a pillar-shaped honeycomb formed body after firing having predetermined design specifications can be obtained based on the pillar-shaped honeycomb formed body before firing.

[1] A method for searching for statistics correlated with a strength of a pillar-shaped honeycomb formed body after firing having predetermined design specifications, the pillar-shaped honeycomb formed body comprising a pillar-shaped honeycomb structure portion having an outer peripheral side wall and partition walls disposed on an inner peripheral side of the outer peripheral side wall and partitioning a plurality of polygonal cells forming flow paths from a first end surface to a second end surface, the method comprising:
a step A of preparing a plurality of pillar-shaped honeycomb formed bodies before firing for preparing pillar-shaped honeycomb formed bodies after firing having predetermined design specifications;
for each of the plurality of pillar-shaped honeycomb formed bodies before firing prepared in the step A, a step B of measuring two or more parameters, which are measurable by observing at least one of the first end surface or the second end surface, for 90% or more of the polygonal cells excluding partial cells at the outermost periphery, and calculating two or more statistics for each parameter measured;
a step C of firing each of the plurality of pillar-shaped honeycomb formed bodies before firing prepared in the step A under predetermined conditions to prepare a plurality of pillar-shaped honeycomb formed bodies after firing;
a step D of evaluating a correlation between the two or more statistics calculated in the step B for each parameter and the strength of the plurality of pillar-shaped honeycomb formed bodies after firing prepared in the step C; and
a step E of determining a statistic having the highest correlation with the strength of the pillar-shaped honeycomb formed bodies after firing having the predetermined design specifications from among the two or more statistics based on a result of the step D.

[2] The method according to [1], wherein the two or more parameters are two or more parameters selected from one or more parameters characterizing a shape or size of opening portion of each polygonal cell, one or more parameters characterizing a shape or size of partition wall portion defining each side of each polygonal cell, and one or more parameters characterizing a shape or size of partition wall portion defining each corner of each polygonal cell.

[3] The method according to [2], wherein the one or more parameters characterizing the shape or size of the opening portion of each polygonal cell comprise one or more selected from opening area, inscribed circle radius, short side of approximate rectangle, long side of approximate rectangle, rectangularity, circularity, compactness, contour length, convexity degree, ratio of major axis to minor axis, ellipticity, structure factor, center distance deviation, roundness degree, circumscribed circle radius, major axis of approximate ellipse, minor axis of approximate ellipse, cell direction, and ratio of short side to long side;
the one or more parameters characterizing the shape or size of the partition wall portion defining each side of each polygonal cell comprise one or more selected from partition wall curvature, partition wall thickness, and partition wall direction; and
the one or more parameters characterizing the shape or size of the partition wall portion defining each corner of each polygonal cell comprise area of the partition wall portion defining the corner.

[4] The method according to any one of [1] to [3], wherein the two or more parameters are ten or more parameters.

[5] The method according to any one of [1] to [4], wherein the two or more statistics are five or more statistics.

[6] The method according to any one of [1] to [5], wherein the two or more statistics include two or more selected from arithmetic mean, standard deviation, kurtosis, skewness, minimum value, median value, and maximum value.

[7] The method according to any one of [1] to [6], wherein the strength is isostatic breaking strength.

[8] A method for predicting whether or not a pillar-shaped honeycomb body after firing having predetermined design specifications can be obtained when firing a pillar-shaped honeycomb formed body before firing under predetermined firing conditions based on a measurement result of the pillar-shaped honeycomb formed body before firing, the pillar-shaped honeycomb formed body before firing comprising a pillar-shaped honeycomb structure portion having an outer peripheral side wall and partition walls disposed on an inner peripheral side of the outer peripheral side wall and partitioning a plurality of polygonal cells forming flow paths from a first end surface to a second end surface, the method comprising:

for 90% or more of the polygonal cells excluding partial cells at an outermost periphery, a step 1 of measuring one or more parameters selected from structure factor characterizing a shape of opening portion, cell direction, ratio of short side to long side, and area of partition wall portion defining corner, by observing at least one of the first end surface and the second end surface of the pillar-shaped honeycomb formed body before firing;

based on a result of the step 1, a step 2 of calculating:
if the parameter measured in the step 1 is the structure factor, one or more statistics selected from arithmetic mean and median value,
if the parameter measured in the step 1 is the cell direction, one or more statistics selected from standard deviation and kurtosis,
if the parameter measured in the step 1 is the ratio of short side to long side, one or more statistics selected from the arithmetic mean, standard deviation and maximum value,
if the parameter measured in the step 1 is the area of partition wall portion defining corner, one or more statistics selected from kurtosis and skewness; and a step 3 of comparing the one or more statistics calculated in the step 2 with a predetermined judgment criterion according to the predetermined design specifications and a type of the statistics.

[9] The method according to [8], comprising a step 4 of estimating a strength of a pillar-shaped honeycomb formed body after the pillar-shaped honeycomb formed body before firing is fired under the predetermined firing conditions based on the one or more statistics calculated in the step 2, by utilizing a correlation between the one or more statistics for the pillar-shaped honeycomb formed body before firing and a strength of a plurality of other pillar-shaped honeycomb formed bodies fired under the predetermined firing conditions, wherein the correlation has been obtained in advance for the plurality of other pillar-shaped honeycomb formed bodies having same design specifications as the pillar-shaped honeycomb formed body.

[10] The method of [9], wherein the strength is isostatic breaking strength.

According to one embodiment of the present invention, there is provided a method for searching for statistics of a pillar-shaped honeycomb formed body before firing that can be measured non-destructively and correlated with the strength of the pillar-shaped honeycomb formed body after firing. The object of the search method according to the embodiment is two or more parameters (characteristic quantity) measurable by observing at least one of the first end surface and the second end surface. Since the end surface observation can be easily performed in a non-destructive manner, the search method according to this embodiment is highly convenient.

In addition, depending on the design specifications of the pillar-shaped honeycomb formed body such as size, shape, cell structure, material, and the like, parameters that are highly correlated with the strength after firing may vary. However, by adopting the search method according to the embodiment, it is possible to find the optimum parameters and statistics according to the design specifications of the pillar-shaped honeycomb formed body. Therefore, according to the search method of the embodiment, it is possible to find the optimum nondestructive inspection method according to the type and product number of the formed honeycomb body.

When the statistics of the pillar-shaped honeycomb formed body begore firing that correlates with the strength of the pillar-shaped honeycomb formed body after firing are searched, it is also possible to provide a method for predicting whether or not a pillar-shaped honeycomb formed body having predetermined design specifications after firing can be obtained based on the pillar-shaped honeycomb formed body before firing. The prediction method can also be used for strength estimation and quality inspection of pillar-shaped honeycomb formed bodies after firing.

By performing the prediction method on a pillar-shaped honeycomb formed body before firing, a formed body which is predicted to fail to yield a pillar-shaped honeycomb formed body after firing having predetermined design specifications can be excluded from the firing targets as an unqualified product. Therefore, there is an advantage that the cost and time required for firing are not wasted. It is preferable if unqualified products can be sorted out before firing because they can be easily reused as raw materials for forming.

DETAILED DESCRIPTION OF THE INVENTION

Hereinafter, embodiments of the present invention will now be described in detail with reference to the drawings. It should be understood that the present invention is not intended to be limited to the following embodiments, and any change, improvement or the like of the design may be appropriately added based on ordinary knowledge of those skilled in the art without departing from the spirit of the present invention.

<1. Pillar-Shaped Honeycomb Formed Body>

The method for searching statistics according to the present invention can observe a pillar-shaped honeycomb formed body before firing. In general, a pillar-shaped honeycomb formed body comprises a pillar-shaped honeycomb structure portion having an outer peripheral side wall and partition walls disposed on the inner peripheral side of the outer peripheral side wall and partitioning a plurality of polygonal cells forming flow paths from a first end surface to a second end surface.

Figure 1:
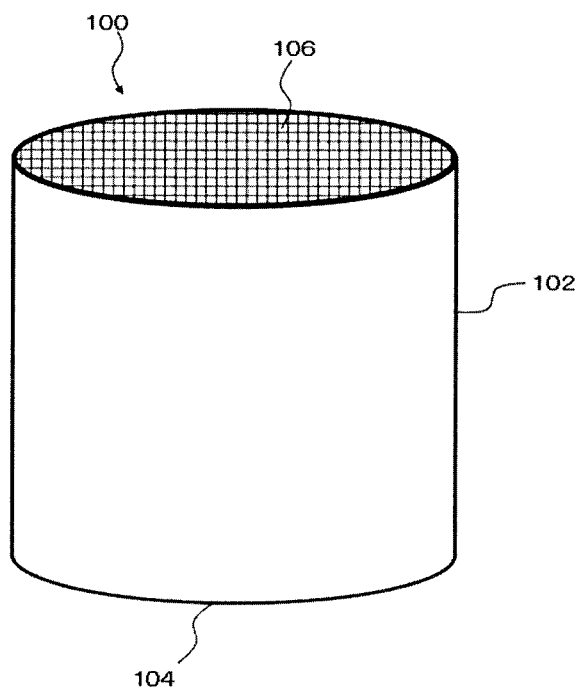
FIG. 1 is a perspective view schematically showing a wall-through pillar-shaped honeycomb formed body.
Figure 2:
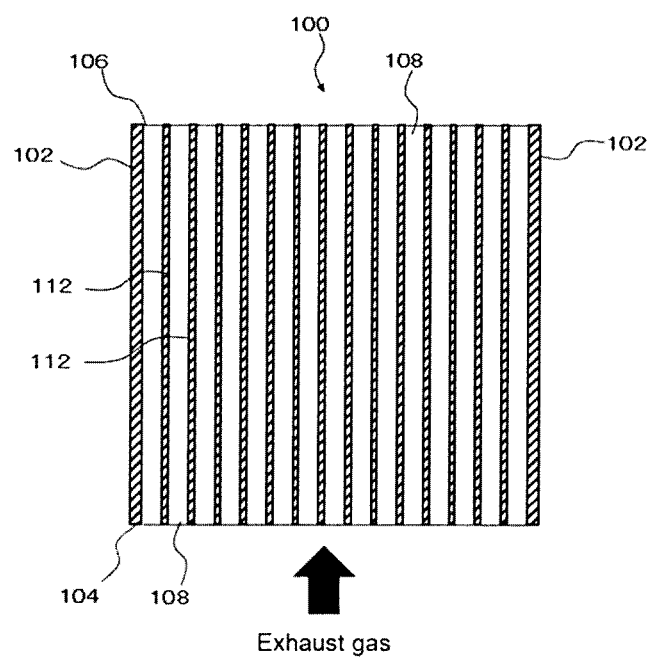
FIG. 2 is a schematic cross-sectional view of a wall-through pillar-shaped honeycomb formed body viewed from a direction perpendicular to the direction in which the cells extend.

FIG. 1 and FIG. 2 illustrate a schematic perspective view and a cross-sectional view, respectively, of a pillar-shaped honeycomb formed body 100 that can be applied as a wall-through type exhaust gas filter and/or catalyst carrier for automobiles. The pillar-shaped honeycomb formed body 100 comprises a pillar-shaped honeycomb structure portion having an outer peripheral side wall 102 and partition walls 112 disposed on the inner peripheral side of the outer peripheral side wall 102 and partitioning a plurality of cells 108 forming flow paths from a first end surface 104 to a second end surface 106. In this pillar-shaped honeycomb formed body 100, both ends of each cell 108 are opened, and exhaust gas that has flowed into one cell 108 from the first end surface 104 is purified while passing through the cell, and is discharged from the second end surface 106.

Figure 3:
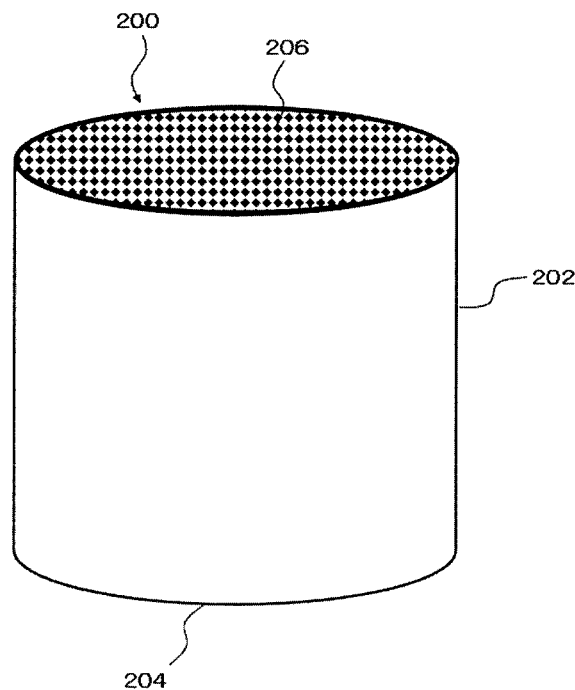
FIG. 3 is a perspective view schematically showing a wall-flow type pillar-shaped honeycomb formed body.
Figure 4:
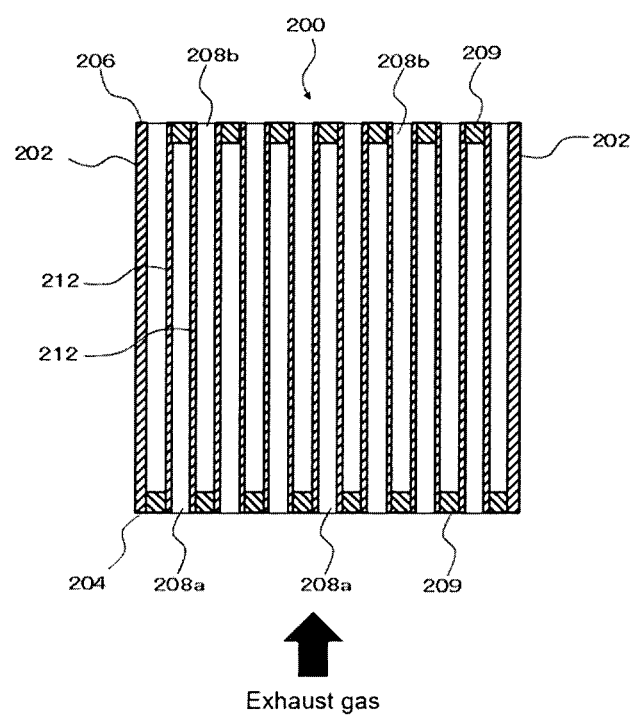
FIG. 4 is a schematic cross-sectional view of a wall-flow type pillar-shaped honeycomb formed body viewed from a direction perpendicular to the direction in which the cells extend.

FIG. 3 and FIG. 4 illustrate a schematic perspective view and a cross-sectional view, respectively, of a pillar-shaped honeycomb formed body 200 that can be applied as a wall-flow type exhaust gas filter and/or catalyst carrier for automobiles. The pillar-shaped honeycomb formed body 200 comprises a pillar-shaped honeycomb structure portion having an outer peripheral side wall 102 and partition walls 212 disposed on the inner peripheral side of the outer peripheral side wall 202 and partitioning a plurality of cells 208a, 208b forming flow paths from a first end surface 204 to a second end surface 206.

In the pillar-shaped honeycomb formed body 200, the plurality of cells 208a and 208b can be divided into a plurality of first cells 208a arranged inside the outer peripheral side wall 202, extending from the first end surface 204 to the second end surface 206, opened on the first end surface 204, and having a sealing portion 209 on the second end surface 206; and a plurality of second cells 208b arranged inside the outer peripheral side wall 202, extending from the first end surface 204 to the second end surface 206, having a sealing portion 209 on the first end surface 204, and opened on the second end surface 206. In addition, in the pillar-shaped honeycomb formed body 200, the first cells 208a and the second cells 208b are alternately arranged adjacent to each other with the partition wall 212 interposed therebetween.

When exhaust gas containing particulate matter (PM) such as soot is supplied to the first end surface 204 on the upstream side of the pillar-shaped honeycomb formed body 200 after firing, the exhaust gas is introduced into the first cells 208a and proceeds downstream in the first cells 208a. Since the first cells 208a have the sealing portion 209 on the second end surface 206 on the downstream side, the exhaust gas permeates the porous partition walls 212 that partition the first cells 208a and the second cells 208b, and flows into the second cells 208b. Since particulate matters (PM) cannot pass through the partition walls 212, they are collected and deposited in the first cells 208a. After the particulate matters (PM) are removed, the clean exhaust gas that has flowed into the second cells 208b proceeds downstream in the second cells 208b and flows out from the second end surface 206 on the downstream side.

The shape of the end surfaces of the pillar-shaped honeycomb formed body 100, 200 filter after firing is not limited, and it may be, for example, a round shape such as a circular, elliptical, racetrack and long circle shape, a polygonal shape such as triangle and quadrangle, and other irregular shapes. The illustrated pillar-shaped honeycomb formed body 100, 200 has a circular end surface shape and have a cylindrical shape as a whole.

The height of the pillar-shaped honeycomb structure (the length from the first end surface to the second end surface) is not particularly limited and may be appropriately set according to the application and required performance. There is no particular limitation on the relationship between the height of the pillar-shaped honeycomb structure and the maximum diameter of each end surface (referring to the maximum length of the diameters passing through the center of gravity of each end surface of the pillar-shaped honeycomb structure). Therefore, the height of the pillar-shaped honeycomb structure may be longer than the maximum diameter of each end surface, or the height of the pillar-shaped honeycomb structure may be shorter than the maximum diameter of each end surface.

In the method for searching statistics according to the present invention, from the viewpoint of facilitating the search for parameters that are highly correlated with strength, a pillar-shaped honeycomb formed body having a plurality of cells with polygonal openings in a cross-section perpendicular to the flow path direction of the cells is targeted. The shape of the cell openings is not particularly limited as long as it is polygonal, but it is preferably quadrangle, hexagon, octagon, or a combination thereof. Among these, squares and hexagons are preferred. By making the shape of the cell openings as described above, the pressure loss when a fluid is caused to flow through the pillar-shaped honeycomb formed body is reduced, and the purification performance of catalyst is excellent.

Figure 5:
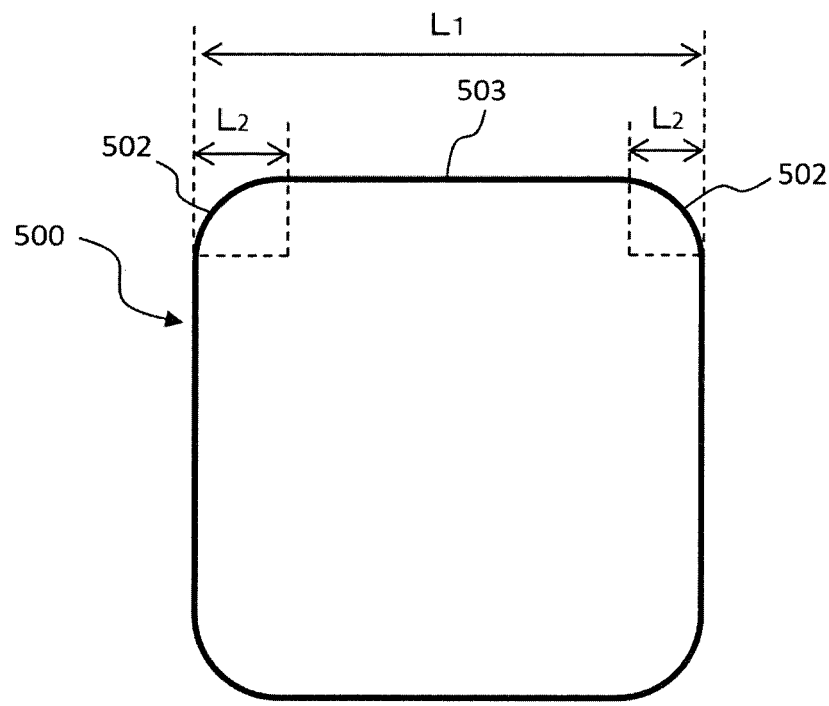
FIG. 5 is a schematic diagram showing an example of an opening shape of a cell.

Here, when the shape of the cell openings is "polygonal", the actual shape of the cell openings does not have to be a mathematically strict polygon, and it means that the shape of the cell openings in design specifications is polygonal. Also, even if each corner (near the vertex) of a polygonal cell is curved due to round chamfering processing or the like, it is regarded as a polygon. Referring to FIG. 5, each side of the polygonal cell 500 has a straight portion 503 and curved corners 502 due to round chamfering processing or the like which are provided at both ends of the straight portion 503. In this case, a ratio ($L_2/L_1$) of the length ($L_2$) of one curved corner 502 along one side of the polygonal cell 500 to the length ($L_1$) of the one side of the polygonal cell 500 assuming that there were no curved corners 502 can be, for example, 0.005 to 0.020. From the viewpoint of suppressing cell deformation and maintaining low pressure loss as an exhaust gas filter, $L_2/L_1$ is preferably 0.005 to 0.008, and from the viewpoint of strength, it is preferably 0.011 to 0.0.017. It should be noted that $L_1$ and $L_2$ here refer to the values in the design specifications of the pillar-shaped honeycomb formed body after firing.

The pillar-shaped honeycomb formed body may comprise cells whose cross-sectional shape is not polygonal, but from the viewpoint that it is easy to find parameters that are highly correlated with strength, of all the cells (including partial cells) in the pillar-shaped honeycomb formed body, the percentage of cells with polygonal openings is preferably 90% or more, more preferably 95% or more, and even more preferably 98% or more.

A "partial cell" refers to a cell positioned at the outermost periphery and at least partially partitioned by the outer peripheral side wall. A partial cell has a contour partly formed by the outer peripheral side wall, and thus has a shape different from cells (hereinafter also referred to as a "normal cell") other than the partial cell, and has a smaller area than a normal cell. The partial cells are appropriately provided in consideration of the arrangement of cells at the outer peripheral side of the pillar-shaped honeycomb formed body, and are cells that exist according to design specifications rather than defects.

The cell density (number of cells per unit cross-sectional area) of the pillar-shaped honeycomb formed body after firing is not particularly limited, but may be, for example, 6 to 2000 cells/square inch (0.9 to 311 cells/cm$^2$), more preferably 50 to 1000 cells/square inch (7.8 to 155 cells/cm$^2$), particularly preferably 100 to 600 cells/square inch (15.5 to 92.0 cells/cm$^2$). Here, the cell density is calculated by dividing the number of cells of the pillar-shaped honeycomb formed body 100, 200 by the area of the one end surface excluding the outer peripheral side wall of the pillar-shaped honeycomb formed body 100, 200.

In the pillar-shaped honeycomb formed body after firing, the partition walls may be porous. The porosity of the partition walls may be appropriately adjusted according to the application, but from the viewpoint of keeping the pressure loss of a fluid low, it is preferably 40% or more, more preferably 50% or more, and even more preferably 60% or more. In addition, the porosity of the partition walls is preferably 80% or less, more preferably 75% or less, and even more preferably 70% or less, from the viewpoint of ensuring the strength of the pillar-shaped honeycomb formed body after firing. The porosity is measured by a mercury intrusion method in accordance with JIS R1655: 2003 using a mercury porosimeter.

The thickness of the partition walls in the pillar-shaped honeycomb formed body after firing is preferably 150 µm or more, more preferably 170 µm or more, and even more preferably 190 µm or more, from the viewpoint of securing strength and enhancing collection efficiency in the case of filter applications. In addition, the thickness of the partition walls is preferably 260 µm or less, more preferably 240 µm or less, and even more preferably 220 µm or less, from the viewpoint of suppressing pressure loss.

When the pillar-shaped honeycomb formed body 100, 200 after firing is used as a catalyst carrier, the surface of the partition walls 112, 212 can be coated with a desired catalyst. The catalyst is not limited, but mention can be made to an oxidation catalyst (DOC) for raising the exhaust gas temperature by oxidative combustion of hydrocarbons (HC) and carbon monoxide (CO), a PM combustion catalyst that assists the combustion of PM such as soot, an SCR catalyst and an NSR catalyst for removing nitrogen oxides (NOx), and a three-way catalyst capable of simultaneously removing hydrocarbons (HC), carbon monoxide (CO) and nitrogen oxides (NOx). The catalyst can appropriately contain, for example, precious metals (Pt, Pd, Rh, and the like), alkali metals (Li, Na, K, Cs, and the like), alkaline earth metals (Mg, Ca, Ba, Sr, and the like), rare earths (Ce, Sm, Gd, Nd, Y, La, Pr, and the like), transition metals (Mn, Fe, Co, Ni, Cu, Zn, Sc, Ti, Zr, V, Cr, and the like) and the like.

<2. Method for Manufacturing a Pillar-Shaped Honeycomb Formed Body>

The pillar-shaped honeycomb formed body can be manufactured by a known manufacturing method, and will be described below as an example. First, a raw material composition containing a ceramic raw material, a dispersion medium, a pore-forming agent and a binder is kneaded to form a green body. Then, by extruding the green body and drying it, a pillar-shaped honeycomb formed body before firing can be manufactured. Additives such as a dispersant can be added to the raw material composition as needed. In extrusion molding, a die having a desired overall shape, cell shape, partition wall thickness, cell density and the like can be used.

In the drying step, conventionally known drying methods such as hot air drying, microwave drying, dielectric drying, reduced pressure drying, vacuum drying, and freeze drying can be used. Among these, a drying method that combines hot air drying and microwave drying or dielectric drying is preferable in that the entire formed body can be dried quickly and uniformly. The sealing portions can be formed by forming the sealing portions at predetermined positions on both end surfaces of the dried honeycomb formed body and then drying the sealing portions.

The ceramic raw material is a raw material for a portion that constitutes the skeleton of the pillar-shaped honeycomb formed body (pillar-shaped honeycomb structure) after firing as ceramics such as metal oxide, metal, or the like that remains after firing. The ceramic raw material can be provided, for example, in the form of powder. Examples of the ceramic raw material include raw materials for obtaining ceramics such as cordierite, mullite, zircon, aluminum titanate, silicon carbide, silicon nitride, zirconia, spinel, indialite, sapphirine, corundum, and titania. Specifically, examples include, but are not limited to, silica, talc, alumina, kaolin, serpentine, pyroferrite, bluesite, boehmite, mullite, magnesite, and aluminum hydroxide. As the ceramic raw material, one type may be used alone, or two or more types may be used in combination.

In the case of filter applications such as DPF and GPF, cordierite can be preferably used as the ceramics. In this case, a cordierite-forming raw material can be used as the ceramic raw material. A cordierite-forming raw material is a raw material that becomes cordierite by firing. It is desirable that the cordierite-forming raw material has a chemical composition of alumina ($Al_2O_3$) (including the amount of aluminum hydroxide that converts to alumina): 30 to 45% by mass, magnesia (MgO): 11 to 17% by mass, and silica ($SiO_2$): 42 to 57% by mass.

Examples of the dispersion medium include water or a mixed solvent of water and an organic solvent such as alcohol, and water can be particularly preferably used.

The pore-forming agent is not particularly limited as long as it becomes pores after firing, and examples thereof include wheat flour, starch, foamed resin, water-absorbing resin, silica gel, carbon (for example, graphite, coke), ceramic balloon, polyethylene, polystyrene, polypropylene, nylon, polyester, acrylic and phenol, and the like. As the pore-forming agent, one type may be used alone, or two or more types may be used in combination. The content of the pore-forming agent is preferably 0.5 parts by mass or more, more preferably 2 parts by mass or more, and even more preferably 3 parts by mass or more with respect to 100 parts by mass of the ceramic raw material, from the viewpoint of increasing the porosity of the honeycomb formed body after firing. The content of the pore-forming agent is preferably 10 parts by mass or less, more preferably 7 parts by mass or less, and even more preferably 4 parts by mass or less with respect to 100 parts by mass of the ceramic raw material, from the viewpoint of ensuring the strength of the honeycomb formed body after firing.

Examples of the binder include organic binders such as methyl cellulose, hydroxypropyl methyl cellulose, hydroxyethyl cellulose, carboxymethyl cellulose, polyvinyl alcohol, and the like. In particular, it is preferable to use methyl cellulose and hydroxypropyl methyl cellulose in combination. Further, the content of the binder is preferably 4 parts by mass or more, more preferably 5 parts by mass or more, and even more preferably 6 parts by mass or more with respect to 100 parts by mass of the ceramic raw material, from the viewpoint of increasing the strength of the honeycomb formed body before firing. The content of the binder is preferably 9 parts by mass or less, more preferably 8 parts by mass or less, and even more preferably 7 parts by mass or less with respect to 100 parts by mass of the ceramic raw material, from the viewpoint of suppressing the occurrence of fragment due to abnormal heat generation in the firing process. As the binder, one type may be used alone, or two or more types may be used in combination.

As the dispersant, ethylene glycol, dextrin, fatty acid soap, polyether polyol and the like can be used. As the dispersant, one type may be used alone, or two or more types may be used in combination. The content of the dispersant is preferably 0 to 2 parts by mass with respect to 100 parts by mass of the ceramic raw material.

Both ends of all the cells in the pillar-shaped honeycomb formed body may be opened, as in the pillar-shaped honeycomb formed body 100 shown in FIG. 1 and FIG. 2. Further, the pillar-shaped honeycomb formed body may have a cell structure in which one end of the cells are sealed alternately, as in the pillar-shaped honeycomb formed body 200 shown in FIG. 3 and FIG. 4. The method for sealing the end surface of the pillar-shaped honeycomb formed body is not particularly limited, and a known method can be adopted.

The material of the sealing portions is not particularly limited, but ceramics is preferable from the viewpoint of strength and heat resistance. The ceramics is preferably ceramics comprising at least one selected from the group consisting of cordierite, mullite, zircon, aluminum titanate, silicon carbide, silicon nitride, zirconia, spinel, indialite, sapphirine, corundum, and titania. The sealing portions are preferably formed of a material comprising 50% by mass or more of these ceramics in total, and more preferably formed of a material comprising 80% by mass or more of these ceramics in total. It is even more preferable that the sealing portions have the same material composition as the main body portion of the honeycomb formed body because the coefficient of thermal expansion at the time of firing can be made the same and the durability can be improved.

A method of forming the sealing portion will be exemplified. A sealing slurry is stored in a storage container. Next, a mask having openings at positions corresponding to the cells on which the sealing portions are to be formed is attached to one of the end surfaces. The end surface to which the mask is attached is immersed in the storage container, and the openings are filled with the sealing slurry so that sealing portions are formed. The sealing portions can be formed on the other end surface in the same manner.

A pillar-shaped honeycomb formed body (pillar-shaped honeycomb structure) after firing can be manufactured by performing degreasing and firing on the pillar-shaped honeycomb formed body before firing. As the conditions of the degreasing process and the firing process, known conditions may be adopted according to the material composition of the honeycomb formed body, and although no particular explanation is required, specific examples of the conditions are given below.

The degreasing process will be described. The combustion temperature of the binder is about 200° C., and the combustion temperature of the pore-forming agent is about 300 to 1000° C. Therefore, the degreasing step may be carried out by heating the honeycomb formed body in the range of about 200 to 1000° C. The heating time is not particularly limited, but is usually about 10 to 100 hours. The honeycomb formed body after the degreasing step is called a calcined body.

The firing process depends on the material composition of the honeycomb formed body, but can be performed, for example, by heating the calcined body to 1350 to 1600° C. and maintaining the temperature for 3 to 10 hours.

<3. Method for Searching Statistics Correlated with Strength>

According to one embodiment of the invention, there is provided a method for searching for statistics correlated with a strength of a pillar-shaped honeycomb formed body after firing having predetermined design specifications, the pillar-shaped honeycomb formed body comprising a pillar-shaped honeycomb structure portion having an outer peripheral side wall and partition walls disposed on an inner peripheral side of the outer peripheral side wall and partitioning a plurality of polygonal cells forming flow paths from a first end surface to a second end surface, the method comprising:

a step A of preparing a plurality of pillar-shaped honeycomb formed bodies before firing for preparing pillar-shaped honeycomb formed bodies after firing having predetermined design specifications;

for each of the plurality of pillar-shaped honeycomb formed bodies before firing prepared in the step A, a step B of measuring two or more parameters, which are measurable by observing at least one of the first end surface or the second end surface, for 90% or more of the polygonal cells excluding partial cells at the outermost periphery, and calculating two or more statistics for each parameter measured;

a step C of firing each of the plurality of pillar-shaped honeycomb formed bodies before firing prepared in the step A under predetermined conditions to prepare a plurality of pillar-shaped honeycomb formed bodies after firing;

a step D of evaluating a correlation between the two or more statistics calculated in the step B for each parameter and the strength of the plurality of pillar-shaped honeycomb formed bodies after firing prepared in the step C; and a step E of determining a statistic having the highest correlation with the strength of the pillar-shaped honeycomb formed bodies after firing having the predetermined design specifications from among the two or more statistics based on a result of the step D.

According to the search method of the present embodiment, a statistic having the highest correlation with the strength of the pillar-shaped honeycomb formed body after firing having predetermined design specifications is determined from statistics relating to two or more parameters measurable by observing at least one of the first end surface and the second end surface of the pillar-shaped honeycomb formed body before firing. Since end surface observation can be easily performed in a non-destructive manner, the search method according to this embodiment is highly convenient. In addition, depending on the design specifications of the pillar-shaped honeycomb formed body such as size, shape, cell structure, material, and the like, parameters that are highly correlated with the strength after firing may vary. However, by adopting the search method according to the embodiment, it is possible to find the optimum parameters and statistics according to the type and product number of the pillar-shaped honeycomb formed body.

(Step A)

In the step A, a plurality of pillar-shaped honeycomb formed bodies before firing are prepared for preparing pillar-shaped honeycomb formed bodies after firing having predetermined design specifications. The method of manufacturing a pillar-shaped honeycomb formed body before firing is as described above, and usually the target dimensions of the pillar-shaped honeycomb formed body before firing are determined in consideration of shrinkage during firing. It is desirable to determine the shape of the die, the conditions of extrusion molding, the conditions of drying, and the like according to the raw material composition so that the pillar-shaped honeycomb formed body before firing to be prepared is close to the target dimensions.

(Step B)

In the step B, for each of the plurality of pillar-shaped honeycomb formed bodies before firing prepared in the step A, two or more parameters, which are measurable by observing at least one of the first end surface or the second end surface are measured for 90% or more, preferably 95% or more, and more preferably the entire number of the polygonal cells (hereinafter also referred to as "normal cell") excluding partial cells at the outermost periphery, and two or more statistics for each parameter measured is calculated. The reason why two or more parameters are measured for the polygonal cells excluding the partial cells at the outermost periphery is to obtain highly reliable statistics. The number of partial cells is small and the correlation with strength is negligible, so they are excluded from parameter measurement targets.

In order to obtain a highly reliable statistics, the number of pillar-shaped honeycomb formed bodies before firing to be measured in the step B is preferably 10 or more, more preferably 20 or more, and even more preferably 50 or more. On the other hand, if the number of pillar-shaped honeycomb formed bodies before firing to be measured is too large, the work load becomes large. Moreover, the statistics converge as the number of data increases. Therefore, the number of pillar-shaped honeycomb formed bodies before firing to be measured in the step B is preferably 500 or less, more preferably 300 or less, and even more preferably 100 or less.

Among the parameters that can be measured by observing at least one of the first end surface or the second end surface, it is preferable to measure parameters that are expected to have a high correlation with the strength of the pillar-shaped honeycomb formed body after firing. Therefore, in a preferred embodiment, the targets of measurement are two or more parameters selected from one or more parameters characterizing the shape or size of opening portion of each polygonal cell, one or more parameters characterizing the shape or size of partition wall portion defining each side of each polygonal cell, and one or more parameters characterizing the shape or size of partition wall portion defining each corner of each polygonal cell.

The one or more parameters characterizing the shape or size of the opening portion of each polygonal cell is not limited, but it is preferable to include one or more selected from opening area, inscribed circle radius, short side of approximate rectangle, long side of approximate rectangle, rectangularity, circularity, compactness, contour length, convexity degree, ratio of major axis to minor axis, ellipticity, structure factor, center distance deviation, roundness degree, circumscribed circle radius, major axis of approximate ellipse, minor axis of approximate ellipse, cell direction, and ratio of short side to long side, and more preferable to include at least the structure factor, the cell direction and the ratio of short side to long side.

The opening area means the area of one cell opening portion.

The inscribed circle radius means the radius of the largest circle inscribed in one cell opening portion.

The short side of approximate rectangle refers to the short side of a minimum rectangle that circumscribes one cell opening portion with rotation taken into consideration.

The long side of approximate rectangle refers to the long side of a minimum rectangle that circumscribes one cell opening portion with rotation taken into consideration.

The rectangularity means the area of the symmetrical difference between the area of one cell opening portion and the area of an approximate rectangle when the one cell opening portion is approximated by the rectangle. The approximate rectangle means a rectangle having the same center of gravity, the same second moment, and the same area as the one cell opening portion. The second moment is the same as the second moment when obtaining an approximate ellipse, which will be described later.

The circularity means the ratio of the area of one cell opening portion and the area of an approximate perfect circle when the one cell opening portion is approximated by the perfect circle having the same area and the same center of gravity as the opening portion. The ratio may be calculated using either as the denominator.

The compactness means the ratio of the area of one cell opening portion to the contour length of the one cell opening portion. The ratio may be calculated using either as the denominator.

The contour length means the contour length of one cell opening portion.

The convexity degree means the ratio of the area of one cell opening portion and the area of an approximate convex hull when the one cell opening portion is approximated by the convex hull. An approximate convex hull is defined as the smallest convex set containing the one cell opening portion. The ratio may be calculated using either as the denominator.

The ratio of major axis to minor axis means the ratio of the major axis to the minor axis of an approximate ellipse when one cell opening portion is approximated by the ellipse. The ratio may be calculated using either as the denominator. For example, the approximate ellipse equation can be obtained by determining the coordinate values of each pixel included in the area that constitutes one cell opening portion, obtaining the barycentric coordinates from the image moment of the area, and then calculating the second moment from the barycentric coordinates.

The ellipticity means the ratio of the area of one cell opening portion to the area of an approximate ellipse when the one cell opening portion is approximated by the ellipse. The ratio may be calculated using either as the denominator.

The structure factor is calculated by the formula:
(structure factor)=(ratio of major axis to minor axis)×(ellipticity)−1.

The center distance deviation means the standard deviation of the lengths of line segments when a number of the line segments connecting the contour of one cell opening portion and its center of gravity are drawn. It is preferable to draw 360 or more line segments with equally spaced angular differences.

The roundness degree means the ratio of the standard deviation (center distance deviation) of the lengths of line segments to the average length of the line segments when a number of the line segments connecting the contour of one cell opening portion and its center of gravity are drawn. The ratio may be calculated using either as the denominator.

The circumscribed circle radius means the radius of the smallest circle that circumscribes one cell opening portion.

The major axis of approximate ellipse means the major axis of an approximate ellipse when one cell opening portion is approximated by the ellipse.

The minor axis of approximate ellipse means the minor axis of an approximate ellipse when one cell opening portion is approximated by the ellipse.

The cell direction means the degree of inclination of an approximate ellipse when one cell opening portion is approximated by the ellipse. The degree of inclination can be expressed in radians (rad) or degrees(°.

The ratio of short side to long side means the ratio of short side to long side of the minimum rectangle circumscribing one cell opening portion with rotation taken into consideration. The ratio may be calculated using either as the denominator.

The one or more parameters characterizing the shape or size of the partition wall portion defining each side of each polygonal cell is not limited, but it is preferable to include one or more, and more preferably two or more selected from partition wall curvature, partition wall thickness, and partition wall direction.

Figure 6:
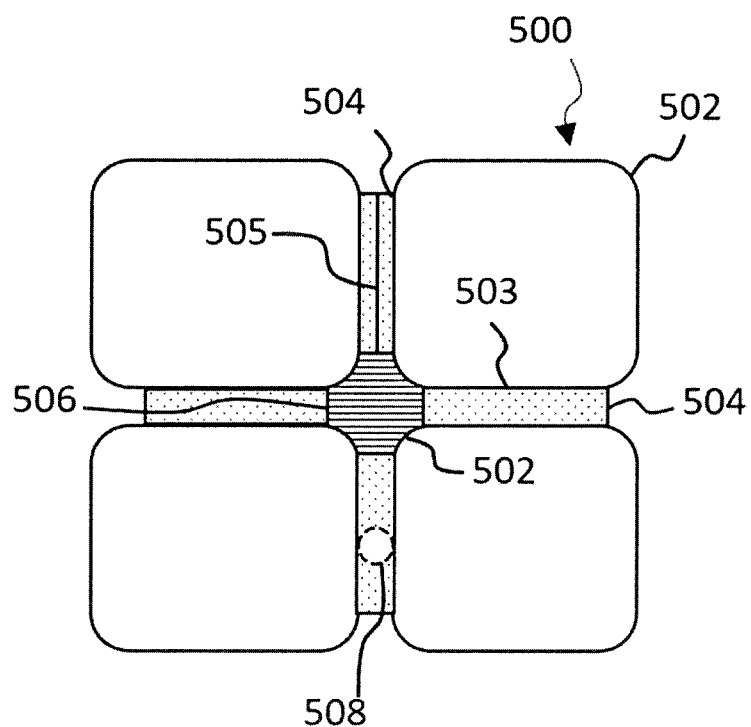
FIG. 6 is a schematic diagram showing linear partition wall portion defining straight portions of polygonal cells and partition wall portion defining corner portions of polygonal cells.
Figure 7:
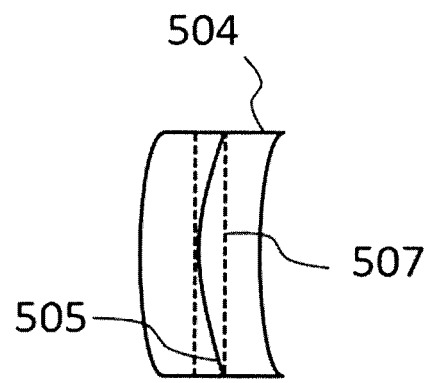
FIG. 7 is a schematic diagram exemplifying a partition wall in which curvature occurred.

The partition wall curvature refers to the length of the short side of a minimum rectangle that can enclose the longitudinal centerline of the partition wall portion that defines the straight portion of the polygonal cell according to design specification. The linear partition wall portion 504 that defines the straight portion 503 of the polygonal cell 500 according to design specification extends linearly in the longitudinal direction, so the length of the short side of the smallest rectangle 507 enclosing its centerline 505 is equal to the thickness of the longitudinally extending centerline 505 (FIG. 6). On the other hand, when the linear partition wall portion 504 is bent in the manufacturing process, the center line 505 is also bent according to the degree of curvature, and the length of the short side of the smallest rectangle 507 that can enclose the center line 505 becomes longer (FIG. 7). The thickness of the center line 505 may be set as appropriate, and may be, for example, 1 to 3 pixels, preferably 1 pixel. In addition, for the partition wall curvature, the statistics may be calculated in terms of linear partition wall portions 504 that are in a parallel positional relationship according to design specification, or the statistics may be calculated collectively for all the linear partition wall portions 504 of all the partition walls.

The partition wall thickness means the radius of the largest circle 508 inscribed in the straight partition wall portion 504 that defines the straight portion 503 of the polygonal cell 500 (FIG. 6). The partition wall thickness may be calculated as the diameter of the largest circle 508. In addition, for the partition wall thickness, the statistics may be calculated in terms of linear partition wall portions 504 that are in a parallel positional relationship to each other according to design specification, or the statistics may be calculated collectively for all the linear partition wall portions 504 of all the partition walls.

The partition wall direction means the degree of inclination in the direction of the longitudinal direction of the linear partition wall portions 504 that are in a parallel positional relationship to each other according to design specification.

The one or more parameters characterizing the shape or size of the partition wall portion defining each corner of each polygonal cell is not limited, but it is preferable to include the area of the partition wall portion defining the corner. Partition wall portion 506 that defines the corner 502 of the polygonal cell 500 refer to a portion of the partition wall that is surrounded by the linear partition wall portion 504 that defines the straight portion 503 of the polygonal cell 500 according to design specification (FIG. 6).

Each of the above parameters and statistics can be automatically measured and calculated using an image processing library from images generated by imaging the first end surface and/or the second end surface with a camera. For example, they can be measured and calculated by HALCON (Ver.18.11 or later version) provided by MVTec Software GmbH.

In order to obtain reliable statistics, it is preferable to observe both the first and second end surfaces. In particular, in the case of a pillar-shaped honeycomb formed body having sealing portions, regarding the cells with sealing portions, there are cells for which the size of the opening portion cannot be measured if only one of the end surfaces is imaged, so it is preferable to observe both end surfaces.

As to the types of parameters to be measured, the larger the number is, the easier it is to discover parameters that are highly correlated with the strength. Therefore, the number of types of parameters to be measured is preferably 10 or more, more preferably 15 or more, and even more preferably 20 or more. On the other hand, the types of parameters to be measured are limited, and as the number of types increases, the man-hours for data processing increases. Therefore, the number of types of parameters to be measured is preferably 30 or less, more preferably 28 or less, and even more preferably 25 or less.

Many types of statistics can be derived from one parameter. The more types of statistics to be considered, the easier it is to discover combinations of parameters and statistics that are highly correlated with strength. For this reason, the number of types of statistics calculated for one parameter is preferably two or more, more preferably 5 or more, and even more preferably 7 or more. On the other hand, the types of statistics to be measured are limited, and as the number of types increases, the man-hours for data processing increases. Therefore, the number of types of statistics calculated for one parameter is preferably 15 or less, more preferably 13 or less, and even more preferably 10 or less.

The types of statistics include, but are not limited to, representative values such as arithmetic mean, standard deviation, kurtosis, skewness, minimum value, median value, maximum value, first quartile, third quartile, range (maximum-minimum), and the like. Among these, it is preferable to include two or more, and preferably 5 or more selected from arithmetic mean, standard deviation, kurtosis, skewness, minimum value, median value, and maximum value, which are empirically predicted to have a high correlation with the strength of the pillar-shaped honeycomb formed body after firing. In particular, it is preferable to include two or more selected from arithmetic mean, standard deviation, minimum value, median value, and maximum value, and more preferable to include all five of these.

When the structure factor of the polygonal cells is to be measured, due to the expectation of particularly high correlation with the strength of the pillar-shaped honeycomb formed body after firing, it is preferable to calculate one or more statistics selected from arithmetic mean and median value, and more preferable to calculate both arithmetic mean and median value.

When the cell direction of the polygonal cells is to be measured, due to the expectation of particularly high correlation with the strength of the pillar-shaped honeycomb formed body after firing, it is preferable to calculate one or more statistics selected from standard deviation and kurtosis, and more preferable to calculate both standard deviation and kurtosis.

When the ratio of short side to long side of the polygonal cells is to be measured, due to the expectation of particularly high correlation with the strength of the pillar-shaped honeycomb formed body after firing, it is preferable to calculate one or more statistics selected from arithmetic mean, standard deviation and maximum value, more preferable to calculate two or more of these statistics, and even more preferable to calculate all the three statistics.

When the area of the partition wall portion defining the corner of the polygonal cells is to be measured, due to the expectation of particularly high correlation with the strength of the pillar-shaped honeycomb formed body after firing, it is preferable to calculate one or more statistics selected from kurtosis and skewness, and more preferable to calculate both kurtosis and skewness.

The method of observing the first end surface or the second end surface of each pillar-shaped honeycomb formed body before firing is not particularly limited, and a method of imaging the first end surface or the second end surface with a camera can be mentioned. Imaging with a camera is preferably performed from a direction perpendicular to the first end surface or the second end surface in order to improve inspection accuracy. The camera may be an area camera or a line camera, but the area camera is preferable because of its fast imaging tact, wide illumination width, and ability to reduce the equipment size. From the viewpoint of improving inspection accuracy, it is preferable to use a camera with high pixel resolution. Specifically, considering the general opening area of the cells, the camera preferably has a pixel resolution in both the vertical and horizontal directions of 40 μm/pixel or less, preferably 25 μm/pixel or less, and for example, 1 to 40 μm/pixel.

The two or more parameters described above are measured in an image generated by imaging with the camera. Various parameters may be measured by an inspector based on the image, but since the number of cells to be inspected is large, automatic measurement using an image analyzer is preferable. An example of the measurement procedure by the image analyzer will be described later.

(Step C)

In the step C, each of the plurality of pillar-shaped honeycomb formed bodies before firing prepared in the step A is fired under predetermined conditions to prepare a plurality of pillar-shaped honeycomb formed bodies after firing. The firing conditions are appropriately set according to the design specifications of the pillar-shaped honeycomb formed body. In order to appropriately evaluate the correlation between various statistics measured before firing and the strength of the pillar-shaped honeycomb formed body after firing, when firing the plurality of pillar-shaped honeycomb formed bodies before firing, it is preferable to match the designed firing conditions such as furnace atmosphere, heat curve, firing time, and the like, in addition to the degreasing conditions before firing. It should be noted that, since the actual firing conditions may inevitably change due to disturbance, "matching the designed firing conditions" means that the firing conditions are not intentionally changed.

(Step D)

In the step D, correlation between the two or more statistics calculated in the step B for each parameter and the strength of the plurality of pillar-shaped honeycomb formed bodies after firing prepared in the step C is evaluated. The correlation between the two can be evaluated, for example, by obtaining a correlation coefficient. It can be said that the larger the absolute value of the correlation coefficient is, the higher the correlation between the two is. If the absolute value of the correlation coefficient is 0.4 or more, it can be said that there is a significant correlation, and the absolute value of the correlation coefficient is preferably 0.5 or more, more preferably 0.6 or more. For evaluation of correlation, in addition to the correlation coefficient, a coefficient of determination, which is a value obtained by squaring the correlation coefficient, can be used.

There are various parameters that represent the strength of the pillar-shaped honeycomb formed body, and there are no particular restrictions, and examples include isostatic breaking strength and compressive strength. Among these, it is preferable to adopt the isostatic breaking strength because it is easy to evaluate whether or not it can withstand the pressurization during canning.

(Step E)

In the step E, a statistic having the highest correlation with the strength of the pillar-shaped honeycomb formed bodies after firing having the predetermined design specifications is determined from among the two or more statistics based on the result of the step D. The statistic that has the highest correlation with the strength of the pillar-shaped honeycomb formed bodies after firing having the predetermined design specifications can be determined, for example, by selecting the statistic with the highest absolute value of the correlation coefficient.

<4. Method for Predicting Whether or not a Pillar-Shaped Honeycomb Body after Firing Having Predetermined Design Specifications can be Obtained>

When the statistic having the highest correlation with the strength of the pillar-shaped honeycomb formed bodies after firing having the predetermined design specifications is determined, by using this statistic, it becomes possible to predict whether or not a pillar-shaped honeycomb formed body after firing having predetermined design specifications can be obtained based on the pillar-shaped honeycomb formed body before firing. Further, it is also possible to estimate the strength of the pillar-shaped honeycomb formed body after firing. Therefore, the statistic can be incorporated as a quality inspection item for the pillar-shaped honeycomb formed body before firing.

Further, according to the research results of the present inventors, regardless of design specifications such as size, shape, cell structure, and material, there are combinations of parameters and statistics that are highly correlated with the strength of the pillar-shaped honeycomb formed bodies after firing. Specifically, the following combinations (1) to (4) are preferred.

(1) A combination of a "structure factor" and one or more statistics selected from arithmetic mean and median value.

(2) A combination of "cell direction" and one or more statistics selected from standard deviation and kurtosis.

(3) A combination of the "ratio of short side to long side" and one or more statistics selected from arithmetic mean, standard deviation and maximum value.

(4) A combination of "area of partition wall portion defining corner" and one or more statistics selected from kurtosis and skewness.

Among the above (1) to (4), the combination of "ratio of short side to long side" and one or more statistics selected from arithmetic mean and standard deviation is more preferable, and the combination of "ratio of short side to long side" and standard deviation is even more preferable.

Therefore, according to one embodiment of the invention, there is provided a method for predicting whether or not a pillar-shaped honeycomb body after firing having predetermined design specifications can be obtained when firing a pillar-shaped honeycomb formed body before firing under predetermined firing conditions based on a measurement result of the pillar-shaped honeycomb formed body before firing, the pillar-shaped honeycomb formed body before firing comprising a pillar-shaped honeycomb structure portion having an outer peripheral side wall and partition walls disposed on an inner peripheral side of the outer peripheral side wall and partitioning a plurality of polygonal cells forming flow paths from a first end surface to a second end surface, the method comprising:

for 90% or more, preferably 95 or more, and more preferably the entire number of the polygonal cells excluding partial cells at an outermost periphery, a step 1 of measuring one or more parameters selected from structure factor, cell direction and ratio of short side to long side characterizing a shape of opening portion, and area of partition wall portion defining corner, by observing at least one of the first end surface and the second end surface of the pillar-shaped honeycomb formed body before firing;

based on a result of the step 1, a step 2 of calculating:
if the parameter measured in the step 1 is the structure factor, one or more statistics selected from arithmetic mean and median value,
if the parameter measured in the step 1 is the cell direction, one or more statistics selected from standard deviation and kurtosis,
if the parameter measured in the step 1 is the ratio of short side to long side, one or more statistics selected from the arithmetic mean, standard deviation and maximum value,
if the parameter measured in the step 1 is the area of the partition wall portion defining corner, one or more statistics selected from kurtosis and skewness; and a step 3 of comparing the one or more statistics calculated in the step 2 with a predetermined judgment criterion according to the predetermined design specifications and a type of the statistics.

As for the judgment criterion used for the comparison in step 3, appropriate criterion may be determined in advance according to predetermined design specifications and types of statistics. As an example, a case will be described in which whether or not a pillar-shaped honeycomb formed body having predetermined design specifications can be obtained is predicted from the standard deviation of the ratio of short side to long side. First, for a plurality of other pillar-shaped honeycomb formed bodies having the same design specifications as the pillar-shaped honeycomb formed body to be predicted, a correlation between the standard deviation of the ratio of short side to long side for the pillar-shaped honeycomb formed body before firing and the strength of the other plurality of pillar-shaped honeycomb formed bodies after firing under predetermined conditions is obtained. Next, based on the obtained correlation, a permissible range of the standard deviation of the ratio of short side to long side, which is expected to cause the required strength after firing, is set for the pillar-shaped honeycomb formed body before firing. Therefore, in this case, the permissible range of the standard deviation of the ratio of short side to long side can be used as judgment criterion.

Quality inspection of the pillar-shaped honeycomb formed body before firing can be performed based on the above judgment criterion. For example, if the calculated standard deviation of the ratio of short side to long side exceeds the permissible range, the pillar-shaped honeycomb formed body can be determined as an unqualified product, and if the calculated standard deviation of the ratio of short side to long side is within the permissible range, the pillar-shaped honeycomb formed body can be determined as an acceptable product.

Further, by utilizing the above correlation, it is also possible to estimate the strength of the pillar-shaped honeycomb formed body after firing. Therefore, according to one embodiment of the prediction method, it comprises a step 4 of estimating a strength of a pillar-shaped honeycomb formed body after the pillar-shaped honeycomb formed body before firing is fired under the predetermined firing conditions based on the one or more statistics calculated in the step 2, by utilizing a correlation between the one or more statistics for the pillar-shaped honeycomb formed body before firing and a strength of a plurality of other pillar-shaped honeycomb formed bodies fired under the predetermined firing conditions, wherein the correlation has been obtained in advance for the plurality of other pillar-shaped honeycomb formed bodies having the same design specifications as the pillar-shaped honeycomb formed body to be estimated.

Quality inspection of the pillar-shaped honeycomb formed body before firing can be performed based on the strength estimated by the above estimation method. For example, if the estimated strength is lower than the strength required for the pillar-shaped honeycomb formed body after firing, the inspected pillar-shaped honeycomb formed body can be determined as a defective product, and if the estimated strength is equal to or higher than the required strength, the product can be determined as an acceptable product.

(Image Analyzer)

Figure 8:
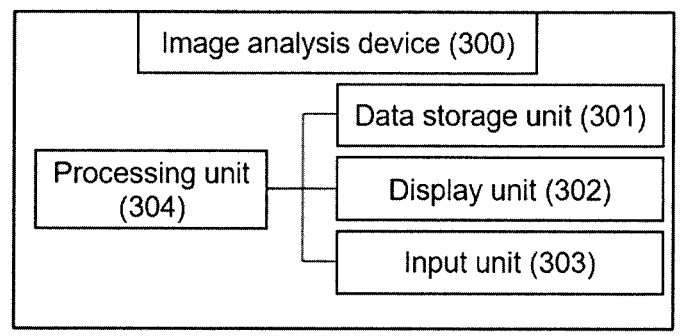
FIG. 8 shows an example of a functional block diagram of an image analyzer.

FIG. 8 shows an example of a functional block diagram of the image analyzer 300. The image analyzer 300 comprises a data storage unit 301, a display unit 302, an input unit 303 and a processing unit 304.

The data storage unit 301 can be configured by, for example, a semiconductor memory, and is capable of storing the image data of at least one of the first end surface and the second end surface of the pillar-shaped honeycomb formed body generated by a camera. Also, the judgment criteria used in step 3 of the prediction method can be stored.

The input unit 303 can be configured by, for example, a keyboard, a touch panel, a numeric keypad, a mouse, and the like, and via the input unit 303, an inspector can give an instruction to start image analysis for a desired image showing the first end surface or the second end surface of the pillar-shaped honeycomb formed body.

The display unit 302 can be configured by a display device such as a liquid crystal display or an organic EL display, and is capable of displaying the image data stored in the data storage unit 301. Also, the result of image analysis may be displayed.

The processing unit 304 can be configured by, for example, a CPU (Central Processing Unit), an MPU (Micro Processing Unit), or the like. Upon receiving an instruction to start image analysis from the input unit 303, the processing unit 304 may execute image analysis based on the image data stored in the data storage unit 301, measure the predetermined parameters, and calculate the statistics. As the software used for image analysis, the above-mentioned HALCON (Ver.18.11 or later version) provided by MVTec Software GmbH can be suitably used.

The image analysis comprises, in one embodiment, a step of image-processing an image of at least one of the first end surface and the second end surface of the pillar-shaped honeycomb formed body captured by a camera; a step of measuring the above-described two or more parameters for 90% or more, preferably 95% or more, and more preferably the entire number of the polygonal cells excluding the partial cells at the outermost periphery, based on the image of at least one of the first end surface and the second end surface obtained by the step of image processing; and a step of calculating the two or more statistics for each of the parameters measured.

In order to facilitate measurement of various parameters, in the step of image processing, it is preferable that the processing unit 304 perform an image processing including:

in the image of at least one of the first end surface and the second end surface of the pillar-shaped honeycomb formed body, a binarization processing that divides the inner peripheral side of the outer peripheral side wall into two regions based on a predetermined luminance threshold value: a cell opening region, and a partition wall region and outer peripheral side wall region;

after the binarization processing, a step of identifying the partition wall region by distinguishing the outer peripheral side wall region as the outer side from a region offset inwardly by a predetermined threshold value from a contour line forming the outer surface of the outer peripheral side wall.

Further, when calculating the "partition wall curvature", it is preferable to perform skeletonization processing for extracting the center line of the partition wall region from the partition wall region.

The threshold in the binarization processing can be set from the viewpoint of distinguishing and recognizing the opening region from the partition wall region and the outer peripheral side wall region. The binarization processing may be performed using a known method, but a dynamic binarization method such as Otsu's binarization method can be preferably used. By performing the binarization processing, it is possible to clearly separate the partition wall portion from the opening portion, thereby obtaining an advantage of facilitating image analysis.

In the skeletonization processing, for example, circles having a diameter corresponding to the thickness of the partition walls can be arranged in series in the partition wall region so as to be adjacent to each other along the direction in which the partition walls extend, and a center line can be extracted by connecting the center pixels of these circles to each other. By performing the skeletonization processing, the center line of the partition walls can be recognized, so that the linearity of the partition walls can be clearly recognized, and an advantage of improved inspection accuracy can be obtained.

In the above-described method for predicting whether or not a pillar-shaped honeycomb body after firing having predetermined design specifications can be obtained when firing under predetermined firing conditions, the step 3 of comparing with the judgment criterion may also be performed by the image analyzer 300. In this case, the data storage unit 301 stores information about the judgment criterion, and the processing unit 304 compares the calculated statistic with the judgment criteria. It is also possible to configure the image analyzer 300 so that the display unit 302 displays the result of the comparison as to whether or not the judgment criterion is satisfied.

Further, in the above-described method for predicting whether or not a pillar-shaped honeycomb body after firing having predetermined design specifications can be obtained when firing under predetermined firing conditions, the step 4 of estimating the strength of the pillar-shaped honeycomb formed body after firing under predetermined firing conditions may also be performed by the image analyzer 300. In this case, the data storage unit 301 stores information about the correlation between the one or more statistics for the pillar-shaped honeycomb formed body before firing and the strength of the other plurality of pillar-shaped honeycomb formed bodies after firing under predetermined firing conditions, and the processing unit 304 estimates the strength based on the calculated statistics. It is also possible to configure the image analyzer 300 so that the estimated strength is displayed on the display unit 302.

EXAMPLES

Test Example 1

(1. Preparation of Honeycomb Formed Bodies)

For honeycomb formed bodies having the following design specifications to which a predetermined product number was to be assigned, honeycomb formed bodies before firing were prepared by the following procedure.

[Design Specifications of Honeycomb Formed Body after Firing]

Overall shape: cylindrical shape with a diameter of 118 mm and a height of 114 mm Cell shape of normal cells in the cross-section perpendicular to the flow path direction: square Design dimension of the opening of normal cells in the cross-section perpendicular to the flow path direction: 0.97 mm×0.97 mm cells/in$^2$ Cell density (number of cells per unit cross-sectional area): 600 cells/in$^2$ Partition wall thickness: 64 μm To 100 parts by mass of the cordierite-forming raw material, 1 part by mass of a pore-forming agent, 30 parts by mass of a dispersion medium, 8 parts by mass of an organic binder, and 1 part by mass of a dispersant were added, followed by mixing and kneading to prepare a green body. Alumina, aluminum hydroxide, kaolin, talc, and silica were used as the cordierite-forming raw materials. Water was used as the dispersion medium, coke having an average particle size of 1 to 10 μm was used as the pore-forming agent, hydroxypropyl methylcellulose was used as the organic binder, and ethylene glycol was used as the dispersant.

This green body was charged into an extruder and horizontally extruded through a predetermined die to obtain a cylindrical honeycomb formed body. After dielectric drying and hot gas drying of the obtained honeycomb formed body, both end surfaces were cut to obtain a cylindrical honeycomb formed body having a predetermined size.

A total number of 306 cylindrical honeycomb formed bodies were prepared in the same procedure as above. However, for 8 of them, the amount of the dispersion medium was intentionally changed in order to reduce the strength, thereby causing distortion of the cell shape. In addition, in the other 298 honeycomb formed bodies, although the manufacturing conditions were not intentionally changed, some dimensional fluctuations inevitably occurred.

(2. Measurement of Various Parameters Characterizing Cells and Calculation of Statistics)

Various parameters of each honeycomb formed body obtained were measured according to the following procedure, and various statistics were calculated for each of the parameters. One end surface of each pillar-shaped honeycomb formed body was imaged from a direction perpendicular to the end surface with an area camera (vertical pixel resolution 0.01455 mm/pixel, horizontal pixel resolution 0.01453 mm/pixel) to generate an image of the end surface. The generated image was subjected to image processing and image analysis using an image processing library (HALCON, Ver.18.11 provided by MVTec Software GmbH), then various parameters shown in Table 1 were measured for all the cells except the partial cells, and the following statistics related to the parameters were calculated for each honeycomb formed body.

[Parameters Characterizing Shape or Size of Opening Portion of Each Polygonal Cell]:
Opening area, inscribed circle radius, short side of approximate rectangle, long side of approximate rectangle, rectangularity, circularity, compactness, contour length, convexity degree, ratio of major axis to minor axis, ellipticity, structure factor, center distance deviation, roundness degree, circumscribed circle radius, major axis of approximate ellipse, minor axis of approximate ellipse, cell direction, and ratio of short side to long side;

[Parameters Characterizing Shape or Size of Partition Wall Portion Defining Each Side of Each Polygonal Cell]:
Partition wall curvature, partition wall thickness, and partition wall direction;
(In a cross-section perpendicular to the direction in which the cells extend, the partition walls extending in the vertical direction during extrusion molding was defined as partition walls 1, the partition walls extending in the horizontal direction during extrusion molding was defined as partition walls 2, and partition wall curvature, partition wall thickness, and partition wall direction were calculated for each of the partition wall 1 and partition wall 2.)

[Parameters Characterizing Shape or Size of Partition Wall Portion Defining Each Corner of Each Polygonal Cell]
Area of the partition wall portion defining corner.

In the image analysis, the following image processing was performed using an image processing library (HALCON, Ver.18.11 available from MVTec Software GmbH).
  In the image of the end surface, binarization processing to divide the inner peripheral side of the outer peripheral side wall into two regions: the cell opening region and the partition wall region, based on the threshold value dynamically calculated by Otsu's binarization method;
  Only when calculating the "partition wall curvature", skeletonization processing for extracting the center line (thickness of 1 pixel=0.01453 mm) of the partition wall region from the partition wall region after smoothing process.

(3. Firing of Honeycomb Formed Bodies)

Next, each honeycomb formed body was degreased under predetermined conditions of 200 to 1000° C. in an air atmosphere, heated to 1350 to 1600° C., and fired under predetermined firing conditions for 3 to 10 hours. All the honeycomb formed bodies were fired under the same firing conditions (the firing conditions were not intentionally changed).

(4. Measurement of Isostatic Breaking Strength)

The isostatic breaking strength of all the honeycomb formed bodies after firing was measured based on the automobile standard (JASO M505-87) issued by the Society of Automotive Engineers of Japan, Inc.

(5. Calculation of Correlation Coefficient)

For all the manufactured honeycomb formed bodies, the correlation coefficient was calculated between the various statistics calculated before firing and the isostatic breaking strength measured after firing. Table 1 shows the results. When the absolute value of the correlation coefficient is 0.4 or more, it is considered that there is a significant correlation between the two. Therefore, in the table, the combination of parameters and statistics with an absolute value of the correlation coefficient of 0.4 or more was indicated as "OK", and the combination of parameters and statistics with an absolute value of the correlation coefficient of less than 0.4 was indicated as "-".

Test Example 2

(1. Preparation of Honeycomb Formed Bodies)

For honeycomb formed bodies having the following design specifications to which a predetermined product number different from Test Example 1 was to be assigned, honeycomb formed bodies before firing were prepared by the same procedure as Test Example 1. Test Example 2 differs from Test Example 1 only in the overall design shape.

[Design Specifications of Honeycomb Formed Body after Firing]
  Overall shape: cylindrical shape with a diameter of 132 mm and a height of 95 mm
    Cell shape of normal cells in the cross-section perpendicular to the flow path direction: square
    Design dimension of the openings of normal cells in the cross-section perpendicular to the flow path direction: 0.97 mm×0.97 mm
    Cell density (number of cells per unit cross-sectional area): 600 cells/in$^2$
    Partition wall thickness: 64 μm A total number of 135 cylindrical honeycomb formed bodies were prepared in the same manner as above. However, for 13 of them, the amount of the dispersion medium was intentionally changed in order to reduce the strength, thereby causing distortion of the cell shape. In addition, in the other 122 honeycomb formed bodies, although the manufacturing conditions were not intentionally changed, some dimensional fluctuations inevitably occurred.

(2. Measurement of Various Parameters Characterizing Cells and Calculation of Statistics)

For each honeycomb formed body obtained, various parameters were measured in the same procedure as in Test Example 1, and various statistics were calculated for each of the parameters.

(3. Firing of Honeycomb Formed Bodies)

Next, each honeycomb formed body was degreased under predetermined conditions of 200 to 1000° C. in an air atmosphere, heated to 1350 to 1600° C., and fired under predetermined firing conditions for 3 to 10 hours. All the honeycomb formed bodies were fired under the same firing conditions (the firing conditions were not intentionally changed).

(4. Measurement of Isostatic Breaking Strength)

The isostatic breaking strength of all the honeycomb formed bodies after firing was measured based on the automobile standard (JASO M505-87) issued by the Society of Automotive Engineers of Japan, Inc.

(5. Calculation of Correlation Coefficient)

For all the manufactured honeycomb formed bodies, the correlation coefficient was calculated between the various statistics calculated before firing and the resulted isostatic breaking strength measured after firing. Table 1 shows the results. When the absolute value of the correlation coefficient is 0.4 or more, it is considered that there is a significant correlation between the two. Therefore, in the table, the combination of parameters and statistics with an absolute value of the correlation coefficient of 0.4 or more was indicated as "OK", and the combination of parameters and statistics with an absolute value of the correlation coefficient of less than 0.4 was indicated as "-".

TABLE 1

| No. | Parameter - Statistics | Test Example 1 | | Test Example 2 | |
|---|---|---|---|---|---|
| | | Correlation coefficient | Absolute value of correlation coefficient ≥0.4 | Correlation coefficient | Absolute value of correlation coefficient ≥0.4 |
| 1 | Opening Area - Arithmetic mean | −0.164154467 | — | −0.423408243 | OK |
| 2 | Opening area - Standard deviation | −0.213455646 | — | −0.764389878 | OK |
| 3 | Opening Area - Kurtosis | −0.03540722 | — | 0.050431696 | — |
| 4 | Opening Area - Skewness | −0.048173724 | — | −0.592250529 | OK |
| 5 | Opening area - Minimum value | 0.011809772 | — | 0.05021573 | — |
| 6 | Opening Area - Median value | −0.175359087 | — | −0.375576185 | — |
| 7 | Opening area - Maximum value | −0.390997657 | — | −0.735057218 | OK |
| 8 | Inscribed circle radius - Arithmetic mean | −0.006464573 | — | −0.28713922 | — |
| 9 | Inscribed circle radius - Standard deviation | −0.274975184 | — | −0.453902385 | OK |
| 10 | Inscribed circle radius - Kurtosis | 0.063657048 | — | −0.007327851 | — |
| 11 | Inscribed circle radius - Skewness | −0.108749176 | — | −0.077850786 | — |
| 12 | Inscribed circle radius - Minimum value | −0.139957749 | — | −0.094965114 | — |
| 13 | Inscribed circle radius - Median value | 0.072250835 | — | −0.241963304 | — |
| 14 | Inscribed circle radius - Maximum value | −0.399353063 | — | −0.575557407 | OK |
| 15 | Short side of approximate rectangle - Arithmetic mean | −0.111779437 | — | −0.306092206 | — |
| 16 | Short side of approximate rectangle - Standard deviation | −0.303427434 | — | −0.808326602 | OK |
| 17 | Short side of approximate rectangle - Kurtosis | −0.235081589 | — | 0.145082267 | — |
| 18 | Short side of approximate rectangle - Skewness | −0.027085993 | — | −0.485719442 | OK |
| 19 | Short side of approximate rectangle - Minimum value | 0.050025144 | — | 0.163168131 | — |
| 20 | Short side of approximate rectangle - Median value | −0.251125098 | — | −0.104383085 | — |
| 21 | Short side of approximate rectangle - Maximum value | −0.343380532 | — | −0.672857302 | OK |
| 22 | Long side of approximate rectangle - Arithmetic mean | −0.322665249 | — | −0.575562286 | OK |
| 23 | Long side of approximate rectangle - Standard deviation | −0.37834449 | — | −0.777288137 | OK |
| 24 | Long side of approximate rectangle - Kurtosis | −0.229833602 | — | −0.192489726 | — |
| 25 | Long side of approximate rectangle - Skewness | −0.318049081 | — | −0.522142528 | OK |
| 26 | Long side of approximate rectangle - Minimum value | −0.027850725 | — | 0.09488024 | — |
| 27 | Long side of approximate rectangle - Median value | −0.26912079 | — | −0.479843553 | OK |
| 28 | Long side of approximate rectangle - Maximum value | −0.346732931 | — | −0.549943792 | OK |
| 29 | Rectangularity - Arithmetic mean | 0.144790621 | — | 0.589606764 | OK |
| 30 | Rectangularity - Standard deviation | −0.153011912 | — | −0.521613885 | OK |
| 31 | Rectangularity - Kurtosis | 0.209087012 | — | 0.270356787 | — |
| 32 | Rectangularity - Skewness | −0.215250836 | — | −0.437026942 | OK |
| 33 | Rectangularity - Minimum value | 0.388248648 | — | 0.134670713 | — |
| 34 | Rectangularity - Median value | −0.046549071 | — | 0.378934563 | — |
| 35 | Rectangularity - Maximum value | −0.084574818 | — | −0.102245596 | — |
| 36 | Circularity - Arithmetic mean | 0.343527129 | — | 0.697620505 | OK |
| 37 | Circularity - Standard deviation | −0.101518997 | — | −0.242754273 | — |
| 38 | Circularity - Kurtosis | −0.121437262 | — | 0.148051926 | — |
| 39 | Circularity - Skewness | 0.068659525 | — | −0.562485662 | OK |
| 40 | Circularity - Minimum value | 0.136772688 | — | 0.087810609 | — |
| 41 | Circularity - Median value | 0.352155792 | — | 0.727617461 | OK |
| 42 | Circularity - Maximum value | 0.178126407 | — | 0.088310514 | — |
| 43 | Compactness - Arithmetic mean | −0.056264076 | — | 0.489028784 | OK |
| 44 | Compactness - Standard deviation | 0.121097113 | — | 0.396684258 | — |
| 45 | Compactness - Kurtosis | 0.093192805 | — | −0.005408653 | — |
| 46 | Compactness - Skewness | 0.105099098 | — | −0.019749621 | — |
| 47 | Compactness - Minimum value | −0.143851171 | — | 0.178866031 | — |
| 48 | Compactness - Median value | −0.061000273 | — | 0.478733709 | OK |
| 49 | Compactness - Maximum value | 0.093344528 | — | 0.013704533 | — |
| 50 | Contour length - Arithmetic mean | −0.178311928 | — | −0.099622893 | — |
| 51 | Contour length - Standard deviation | −0.056654152 | — | −0.168296195 | — |
| 52 | Contour length - Kurtosis | 0.186836597 | — | 0.006295937 | — |
| 53 | Contour length - Skewness | 0.257608224 | — | 0.141339255 | — |
| 54 | Contour length - Minimum value | −0.022178092 | — | 0.23255816 | — |
| 55 | Contour length - Median value | −0.20253779 | — | −0.156069053 | — |
| 56 | Contour length - Maximum value | 0.09665015 | — | −0.025640844 | — |
| 57 | Convexity degree - Arithmetic mean | 0.119511354 | — | −0.168643469 | — |
| 58 | Convexity degree - Standard deviation | −0.11074822 | — | −0.280937124 | — |
| 59 | Convexity degree - Kurtosis | 0.031180092 | — | −0.008200792 | — |
| 60 | Convexity degree - Skewness | −0.019654401 | — | 0.035183261 | — |

TABLE 1-continued

|  |  | Test Example 1 | | Test Example 2 | |
| --- | --- | --- | --- | --- | --- |
| No. | Parameter - Statistics | Correlation coefficient | Absolute value of correlation coefficient ≥0.4 | Correlation coefficient | Absolute value of correlation coefficient ≥0.4 |
| 61 | Convexity degree - Minimum value | −0.030280938 | — | 0.010932814 | — |
| 62 | Convexity degree - Median value | 0.113759346 | — | −0.171688867 | — |
| 63 | Convexity degree - Maximum value | −0.012035045 | — | −0.239724995 | — |
| 64 | Ratio of major axis to minor axis - Arithmetic mean | −0.333770355 | — | −0.664833949 | OK |
| 65 | Ratio of major axis to minor axis - Standard deviation | −0.268658846 | — | −0.574749231 | OK |
| 66 | Ratio of major axis to minor axis - Kurtosis | −0.210110333 | — | 0.018597374 | — |
| 67 | Ratio of major axis to minor axis - Skewness | −0.178211177 | — | 0.033238423 | — |
| 68 | Ratio of major axis to minor axis - Minimum value | −0.13038493 | — | −0.114248821 | — |
| 69 | Ratio of major axis to minor axis - Median value | −0.385862819 | — | −0.695915058 | OK |
| 70 | Ratio of major axis to minor axis - Maximum value | −0.187870297 | — | −0.343700383 | — |
| 71 | Ellipticity - Arithmetic mean | −0.232579972 | — | −0.319487091 | — |
| 72 | Ellipticity - Standard deviation | −0.195759929 | — | −0.215053057 | — |
| 73 | Ellipticity - Kurtosis | 0.036401867 | — | −0.008478577 | — |
| 74 | Ellipticity - Skewness | 0.039637734 | — | −0.019086717 | — |
| 75 | Ellipticity - Minimum value | 0.005953557 | — | 0.037025326 | — |
| 76 | Ellipticity - Median value | −0.242704761 | — | −0.374044787 | — |
| 77 | Ellipticity - Maximum value | 0.022267494 | — | −0.008651187 | — |
| 78 | Structure Factor - Arithmetic mean | −0.425660742 | OK | −0.694797347 | OK |
| 79 | Structure Factor - Standard deviation | −0.275281034 | — | −0.573062637 | OK |
| 80 | Structural Factor - Kurtosis | −0.095214979 | — | 0.050970426 | — |
| 81 | Structural Factor - Skewness | −0.140292878 | — | 0.038429335 | — |
| 82 | Structural Factor - Minimum value | −0.166974841 | — | −0.289140215 | — |
| 83 | Structural Factor - Median value | −0.485181744 | OK | −0.721402625 | OK |
| 84 | Structural Factor - Maximum value | −0.128435714 | — | −0.206821783 | — |
| 85 | Center distance deviation - Arithmetic mean | −0.268863683 | — | −0.586562001 | OK |
| 86 | Center distance deviation - Standard deviation | −0.316318934 | — | −0.401905279 | OK |
| 87 | Center distance deviation - Kurtosis | 0.041063427 | — | −0.052206129 | — |
| 88 | Center distance deviation - Skewness | 0.022000239 | — | −0.085415539 | — |
| 89 | Center distance deviation - Minimum value | −0.130132637 | — | −0.189409849 | — |
| 90 | Center distance deviation - Median value | −0.268402976 | — | −0.576255165 | OK |
| 91 | Center distance deviation - Maximum value | 0.063679149 | — | −0.047019531 | — |
| 92 | Roundness - Arithmetic mean | 0.279518096 | — | 0.578238147 | OK |
| 93 | Roundness - Standard deviation | −0.279389058 | — | −0.414771457 | OK |
| 94 | Roundness - Kurtosis | 0.027662118 | — | −0.060811489 | — |
| 95 | Roundness - Skewness | −0.01973337 | — | 0.066401427 | — |
| 96 | Roundness - Minimum value | −0.060569448 | — | 0.037328537 | — |
| 97 | Roundness - Median value | 0.285583734 | — | 0.587555246 | OK |
| 98 | Roundness - Maximum value | 0.034702534 | — | 0.003020303 | — |
| 99 | Circumscribed circle radius - Arithmetic mean | −0.231508926 | — | −0.575868667 | OK |
| 100 | Circumscribed circle radius - Standard deviation | −0.210110847 | — | −0.602152991 | OK |
| 101 | Circumscribed circle radius - Kurtosis | −0.247319341 | — | −0.247261567 | — |
| 102 | Circumscribed circle radius - Skewness | −0.015414173 | — | −0.005396962 | — |
| 103 | Circumscribed circle radius - Minimum value | −0.063866075 | — | −0.1076761 | — |
| 104 | Circumscribed circle radius - Median value | −0.259279891 | — | −0.581284621 | OK |
| 105 | Circumscribed circle radius - Maximum value | −0.264789072 | — | −0.520833914 | OK |
| 106 | Major axis of approximate ellipse - Arithmetic mean | −0.285922351 | — | −0.696023099 | OK |
| 107 | Major axis of approximate ellipse - Standard deviation | −0.280687611 | — | −0.717591272 | OK |
| 108 | Major axis of approximate ellipse - Kurtosis | −0.229870064 | — | −0.198213297 | — |
| 109 | Major axis of approximate ellipse - Skewness | −0.231479067 | — | −0.230704254 | — |
| 110 | Major axis of approximate ellipse - Minimum value | −0.023421726 | — | −0.004456113 | — |
| 111 | Major axis of approximate ellipse - Median value | −0.293963 | — | −0.667934833 | OK |
| 112 | Major axis of approximate ellipse - Maximum value | −0.336273696 | — | −0.657683938 | OK |
| 113 | Minor axis of approximate ellipse - Arithmetic mean | −0.064688174 | — | −0.09649507 | — |
| 114 | Minor axis of approximate ellipse - Standard deviation | −0.243293916 | — | −0.713285752 | OK |
| 115 | Minor axis of approximate ellipse - Kurtosis | −0.183788495 | — | 0.141238595 | — |
| 116 | Minor axis of approximate ellipse - Skewness | 0.189809282 | — | −0.275663691 | — |
| 117 | Minor axis of approximate ellipse - Minimum value | 0.127609413 | — | 0.14775062 | — |
| 118 | Minor axis of approximate ellipse - Median value | −0.086232178 | — | −0.090387448 | — |
| 119 | Minor axis of approximate ellipse - Maximum value | −0.278856264 | — | −0.683444903 | OK |
| 120 | Cell direction - Arithmetic mean | 0.256370828 | — | −0.542946902 | OK |
| 121 | Cell direction - Standard deviation | 0.435038231 | OK | −0.502958528 | OK |
| 122 | Cell direction - Kurtosis | −0.506422257 | OK | 0.498380203 | OK |
| 123 | Cell direction - Skewness | −0.220283442 | — | 0.613059057 | OK |
| 124 | Cell direction - Minimum value | 0.002761422 | — | 0.014421157 | — |
| 125 | Cell direction - Median value | 0.1889715 | — | −0.645625156 | OK |
| 126 | Cell direction - Maximum value | −0.020049917 | — | −0.083405847 | — |
| 127 | Ratio of short side to long side - Arithmetic mean | −0.531051989 | OK | −0.725632392 | OK |
| 128 | Ratio of short side to long side - Standard deviation | −0.61040393 | OK | −0.751746706 | OK |
| 129 | Ratio of short side to long side - Kurtosis | −0.256717614 | — | −0.021003059 | — |
| 130 | Ratio of short side to long side - Skewness | −0.314997196 | — | −0.039824873 | — |
| 131 | Ratio of short side to long side - Minimum value | Incalculable | — | Incalculable | — |
| 132 | Ratio of short side to long side - Median value | −0.044216255 | — | −0.318743984 | — |
| 133 | Ratio of short side to long side - Maximum value | −0.441647824 | OK | −0.456545247 | OK |
| 134 | Partition wall curvature (partition wall 1) - Arithmetic mean | −0.234235017 | — | 0.011038896 | — |

TABLE 1-continued

|     |                                                                          | Test Example 1          |                                                    | Test Example 2          |                                                    |
| --- | ------------------------------------------------------------------------ | ----------------------- | -------------------------------------------------- | ----------------------- | -------------------------------------------------- |
| No. | Parameter - Statistics                                                   | Correlation coefficient | Absolute value of correlation coefficient ≥ 0.4    | Correlation coefficient | Absolute value of correlation coefficient ≥ 0.4    |
| 135 | Partition wall curvature (partition wall 1) - Standard deviation         | −0.246398948            | —                                                  | −0.42678214             | OK                                                 |
| 136 | Partition wall curvature (partition wall 1) - Kurtosis                   | 0.014832443             | —                                                  | 0.118052027             | —                                                  |
| 137 | Partition wall curvature (partition wall 1) - Skewness                   | −0.135944017            | —                                                  | 0.130250361             | —                                                  |
| 138 | Partition wall curvature (partition wall 1) - Minimum value              | Incalculable            | —                                                  | Incalculable            | —                                                  |
| 139 | Partition wall curvature (partition wall 1) - Median value               | −0.065370962            | —                                                  | 0.174647288             | —                                                  |
| 140 | Partition wall curvature (partition wall 1) - Maximum value              | −0.015175342            | —                                                  | 0.102645071             | —                                                  |
| 141 | Partition wall curvature (partition wall 2) - Arithmetic mean            | −0.188039344            | —                                                  | 0.127016776             | —                                                  |
| 142 | Partition wall curvature (partition wall 2) - Standard deviation         | −0.002853776            | —                                                  | −0.442283898            | OK                                                 |
| 143 | Partition wall curvature (partition wall 2) - Kurtosis                   | −0.020300867            | —                                                  | 0.016584919             | —                                                  |
| 144 | Partition wall curvature (partition wall 2) - Skewness                   | −0.024850922            | —                                                  | 0.031269233             | —                                                  |
| 145 | Partition wall curvature (partition wall 2) - Minimum value              | Incalculable            | —                                                  | Incalculable            | —                                                  |
| 146 | Partition wall curvature (partition wall 2) - Median value               | −0.007234283            | —                                                  | 0.178280856             | —                                                  |
| 147 | Partition wall curvature (partition wall 2) - Maximum value              | −0.007376072            | —                                                  | 0.078165891             | —                                                  |
| 148 | Partition wall thickness (partition wall 1) - Arithmetic mean            | 0.13190026              | —                                                  | 0.553698303             | OK                                                 |
| 149 | Partition wall thickness (partition wall 1) - Standard deviation         | −0.113564794            | —                                                  | 0.33003887              | —                                                  |
| 150 | Partition wall thickness (partition wall 1) - Kurtosis                   | 0.072344568             | —                                                  | −0.108828262            | —                                                  |
| 151 | Partition wall thickness (partition wall 1) - Skewness                   | −0.088616924            | —                                                  | 0.374067598             | —                                                  |
| 152 | Partition wall thickness (partition wall 1) - Minimum value              | 0.035090315             | —                                                  | 0.420031709             | OK                                                 |
| 153 | Partition wall thickness (partition wall 1) - Median value               | 0.282683293             | —                                                  | Incalculable            | —                                                  |
| 154 | Partition wall thickness (partition wall 1) - Maximum value              | 0.095052227             | —                                                  | 0.089765913             | —                                                  |
| 155 | Partition wall thickness (partition wall 2) - Arithmetic mean            | −0.070487275            | —                                                  | 0.464840783             | OK                                                 |
| 156 | Partition wall thickness (partition wall 2) - Standard deviation         | −0.133097302            | —                                                  | 0.468058221             | OK                                                 |
| 157 | Partition wall thickness (partition wall 2) - Kurtosis                   | −0.047795462            | —                                                  | −0.218943228            | —                                                  |
| 158 | Partition wall thickness (partition wall 2) - Skewness                   | −0.108995177            | —                                                  | −0.32500782             | —                                                  |
| 159 | Partition wall thickness (partition wall 2) - Minimum value              | −0.040531581            | —                                                  | 0.130186027             | —                                                  |
| 160 | Partition wall thickness (partition wall 2) - Median value               | 0.014826765             | —                                                  | 0.282238608             | —                                                  |
| 161 | Partition wall thickness (partition wall 2) - Maximum value              | 0.001323559             | —                                                  | −0.009453364            | —                                                  |
| 162 | Partition wall direction (partition wall 1) - Arithmetic mean            | −0.059370137            | —                                                  | 0.105522812             | —                                                  |
| 163 | Partition wall direction (partition wall 1) - Standard deviation         | −0.215032962            | —                                                  | −0.333439666            | —                                                  |
| 164 | Partition wall direction (partition wall 1) - Kurtosis                   | −0.061463846            | —                                                  | −0.246307852            | —                                                  |
| 165 | Partition wall direction (partition wall 1) - Skewness                   | −0.12491022             | —                                                  | −0.358747516            | —                                                  |
| 166 | Partition wall direction (partition wall 1) - Minimum value              | 0.085273348             | —                                                  | 0.134860664             | —                                                  |
| 167 | Partition wall direction (partition wall 1) - Median value               | −0.049582818            | —                                                  | 0.161093355             | —                                                  |
| 168 | Partition wall direction (partition wall 1) - Maximum value              | −0.122137969            | —                                                  | −0.247411584            | —                                                  |
| 169 | Partition wall direction (partition wall 2) - Arithmetic mean            | 0.012833191             | —                                                  | −0.131908293            | —                                                  |
| 170 | Partition wall direction (partition wall 2) - Standard deviation         | −0.022507726            | —                                                  | −0.026651111            | —                                                  |
| 171 | Partition wall direction (partition wall 2) - Kurtosis                   | 0.081160324             | —                                                  | −0.126825129            | —                                                  |
| 172 | Partition wall direction (partition wall 2) - Skewness                   | −0.08391542             | —                                                  | 0.173170901             | —                                                  |
| 173 | Partition wall direction (partition wall 2) - Minimum value              | −0.00887067             | —                                                  | 0.106187979             | —                                                  |
| 174 | Partition wall direction (partition wall 2) - Median value               | 0.008112621             | —                                                  | −0.20002363             | —                                                  |
| 175 | Partition wall direction (partition wall 2) - Maximum value              | Incalculable            | —                                                  | Incalculable            | —                                                  |
| 176 | Area of partition wall portion defining corner - Arithmetic mean         | 0.217613254             | —                                                  | 0.550362938             | OK                                                 |
| 177 | Area of partition wall portion defining corner - Standard deviation      | −0.154704449            | —                                                  | 0.020061318             | —                                                  |
| 178 | Area of partition wall portion defining corner - Kurtosis                | −0.420468892            | OK                                                 | −0.518014439            | OK                                                 |
| 179 | Area of partition wall portion defining corner - Skewness                | −0.459836785            | OK                                                 | −0.542915807            | OK                                                 |
| 180 | Area of partition wall portion defining corner - Minimum value           | 0.035097512             | —                                                  | 0.523528678             | OK                                                 |
| 181 | Area of partition wall portion defining corner - Median value            | 0.285334292             | —                                                  | 0.568691804             | OK                                                 |
| 182 | Area of partition wall portion defining corner - Maximum value           | 0.036676268             | —                                                  | 0.276506597             | —                                                  |

Discussion

In the honeycomb formed bodies having the design specifications according to Test Example 1, the following combinations of parameters and statistics have absolute values of correlation coefficients of 0.4 or more, indicating significant correlation. Moreover, the combination of the ratio of short side to long side and the standard deviation had the highest correlation coefficient.

Figure 9:
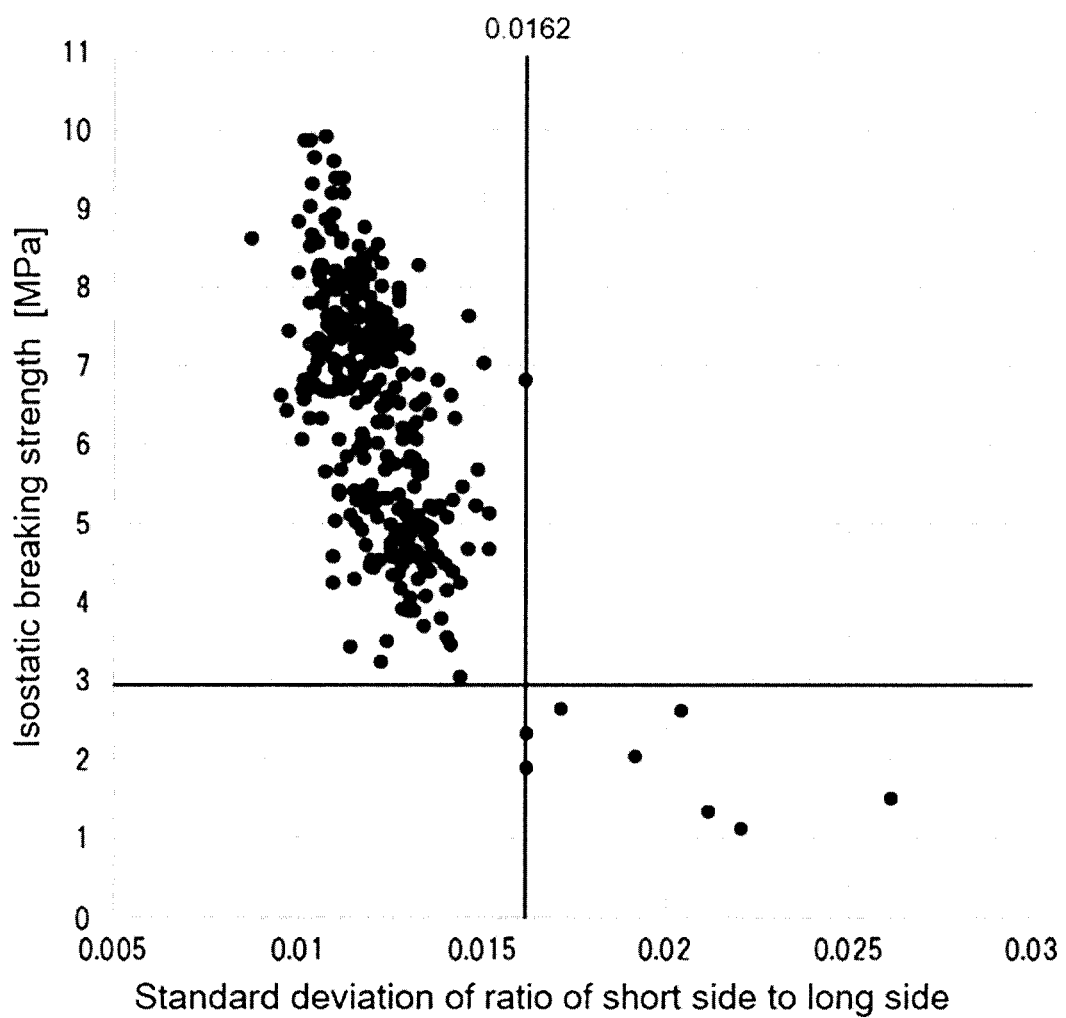
FIG. 9 shows the result of plotting the honeycomb formed bodies according to Test Example 1 on two-dimensional coordinates, with the standard deviation of the ratio of short side to long side on the horizontal axis and the isostatic breaking strength on the vertical axis.

Combination of structure factor and arithmetic mean
Combination of structure factor and median value
Combination of cell direction and standard deviation
Combination of cell direction and kurtosis
Combination of ratio of short side to long side and arithmetic mean
Combination of ratio of short side to long side and standard deviation Combination of ratio of short side to long side and maximum value Combination of area of partition wall portion defining corner and kurtosis Combination of area of partition wall portion defining corner and skewness FIG. 9 shows the result of plotting all the honeycomb formed bodies according to Test Example 1 on two-dimensional coordinates, with the standard deviation of the ratio of short side to long side on the horizontal axis and the isostatic breaking strength on the vertical axis. From FIG. 9, it can be seen that the isostatic breaking strength is 3 MPa or more when the standard deviation of the ratio of short side to long side is 0.0162 or less. Therefore, for example, when the isostatic breaking strength of 3 MPa or more is the strength required for the honeycomb formed bodies after firing, it is possible to perform quality inspection with high accuracy by determining whether or not a pillar-shaped honeycomb formed body after firing having design specifications according to Test Example 1 can be obtained based on the judgment criterion of determining whether or not the standard deviation of short side to long side of the honeycomb formed body before firing is 0.0162 or less (a number of excessive detection where a qualified product is determined as an unqualified product=0, a number of oversight where an unqualified product is determined as a qualified product=0).

In the honeycomb formed bodies having the design specifications according to Test Example 2, the following combinations of parameters and statistics have absolute values of correlation coefficients of 0.4 or more, indicating significant correlation. Moreover, the combination of the short side of approximate rectangle and the standard deviation had the highest correlation coefficient.

Figure 10:
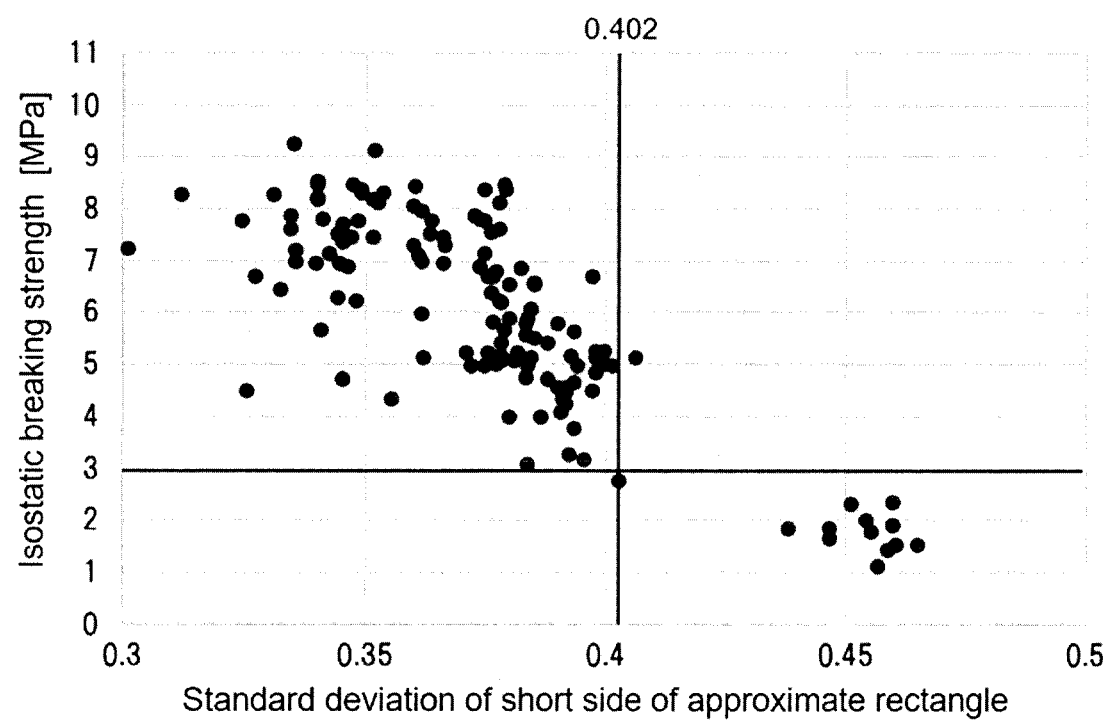
FIG. 10 shows the results of plotting the honeycomb formed body according to Test Example 2 on two-dimensional coordinates, with the standard deviation of the short side of approximate rectangle on the horizontal axis and the isostatic breaking strength on the vertical axis.

Combination of opening area and arithmetic mean
Combination of opening area and standard deviation
Combination of opening area and skewness
Combination of opening area and maximum value
Combination of inscribed circle radius and standard deviation
Combination of inscribed circle radius and maximum value
Combination of short side of approximate rectangle and standard deviation
Combination of short side of approximate rectangle and skewness
Combination of short side of approximate rectangle and maximum value
Combination of long side of approximate rectangle and arithmetic mean
Combination of long side of approximate rectangle and standard deviation
Combination of long side of approximate rectangle and skewness
Combination of long side of approximate rectangle and median value
Combination of long side of approximate rectangle and maximum value
Combination of rectangularity and arithmetic mean
Combination of rectangularity and standard deviation
Combination of rectangularity and skewness
Combination of circularity and arithmetic mean
Combination of circularity and skewness
Combination of circularity and median value
Combination of compactness and arithmetic mean
Combination of compactness and median value
Combination of ratio of major axis to minor axis and arithmetic mean
Combination of ratio of major axis to minor axis and standard deviation
Combination of ratio of major axis to minor axis and median value
Combination of structure factor and arithmetic mean
Combination of structure factor and standard deviation
Combination of structure factor and median value
Combination of center distance deviation and arithmetic mean
Combination of center distance deviation and standard deviation
Combination of center distance deviation and median value
Combination of roundness and arithmetic mean
Combination of roundness and standard deviation
Combination of roundness and median value
Combination of circumscribed circle radius and arithmetic mean
Combination of circumscribed circle radius and standard deviation
Combination of circumscribed circle radius and median value
Combination of circumscribed circle radius and maximum value
Combination of major axis of approximate ellipse and arithmetic mean
Combination of major axis of approximate ellipse and standard deviation
Combination of major axis of approximate ellipse and median value
Combination of major axis of approximate ellipse and maximum value
Combination of minor axis of approximate ellipse and standard deviation
Combination of minor axis of approximate ellipse and maximum value
Combination of cell direction and arithmetic mean
Combination of cell direction and standard deviation
Combination of cell direction and kurtosis
Combination of cell direction and skewness
Combination of cell direction and median value
Combination of ratio of short side to long side and arithmetic mean
Combination of ratio of short side to long side and standard deviation
Combination of ratio of short side to long side and maximum value
Combination of partition wall curvature (partition wall 1) and standard deviation
Combination of partition wall curvature (partition wall 2) and standard deviation
Combination of partition wall thickness (partition wall 1) and arithmetic mean
Combination of partition wall thickness (partition wall 1) and minimum value
Combination of partition wall thickness (partition wall 2) and arithmetic mean
Combination of partition wall thickness (partition wall 2) and standard deviation
Combination of area of partition wall portion defining corner and arithmetic mean
Combination of area of partition wall portion defining corner and kurtosis
Combination of area of partition wall portion defining corner and skewness Combination of area of partition wall portion defining corner and minimum value Combination of area of partition wall portion defining corner and median value FIG. 10 shows the result of plotting all the honeycomb formed bodies produced in Test Example 2 on two-dimensional coordinates, with the standard deviation of the short side of approximate rectangle on the horizontal axis and the isostatic breaking strength on the vertical axis. From FIG. 10, it can be seen that the probability that the isostatic breaking strength is 3 MPa or more is extremely high when the standard deviation of the short side of approximate rectangle is 0.402 or less. Therefore, for example, when the isostatic breaking strength of 3 MPa or more is the strength required for the honeycomb formed bodies after firing, it is possible to perform quality inspection with high accuracy by determining whether or not a pillar-shaped honeycomb formed body after firing having design specifications according to Test Example 2 can be obtained based on the judgment criterion of determining whether or not the standard deviation of the short side of approximate rectangle of the honeycomb formed body before firing is 0.402 or less (a number of excessive detection where a qualified product is determined as an unqualified product=1, a number of oversight where an unqualified product is determined as a qualified product=0).

In addition, from the above results, the following combinations of parameters and statistics have absolute values of correlation coefficients of 0.4 or more in both Test Example 1 and Test Example 2, indicating significant correlation. In other words, these combinations of these parameters and statistics have a high correlation with the strength even if the design specifications of the honeycomb formed body are changed. In particular, the combination of the ratio of short side to long side and the standard deviation has an absolute value of the correlation coefficient of 0.6 or more in both Test Example 1 and Test Example 2, and is highly versatile.

Combination of structure factor and arithmetic mean
Combination of structure factor and median value
Combination of cell direction and standard deviation
Combination of cell direction and kurtosis
Combination of ratio of short side to long side and arithmetic mean
Combination of ratio of short side to long side and standard deviation
Combination of ratio of short side to long side and maximum value
Combination of area of partition wall portion defining corner and kurtosis
Combination of area of partition wall portion defining corner and skewness

DESCRIPTION OF REFERENCE NUMERALS 100, 200 Pillar-shaped honeycomb formed body
102, 202 Outer peripheral side wall
104, 204 First end surface
106, 206 Second end surface
108, 208a, 208b Cell
112, 212 Partition wall
209 Sealing portion
300 Image analyzer
301 Data storage unit
302 Display unit
303 Input unit
304 Processing unit
500 Polygonal cells
502 Corner
503 Straight part
504 Linear partition wall portion defining straight portions of polygonal cell
505 Center line
506 Partition wall portion defining corners of polygonal cell
507 Smallest rectangle
508 Largest circle

The invention claimed is:

1. A method for searching for statistics correlated with a strength of a pillar-shaped honeycomb formed body after firing having predetermined design specifications, the pillar-shaped honeycomb formed body comprising a pillar-shaped honeycomb structure portion having an outer peripheral side wall and partition walls disposed on an inner peripheral side of the outer peripheral side wall and partitioning a plurality of polygonal cells forming flow paths from a first end surface to a second end surface, the method comprising:

a step A of preparing a plurality of pillar-shaped honeycomb formed bodies before firing for preparing pillar-shaped honeycomb formed bodies after firing having predetermined design specifications;

for each of the plurality of pillar-shaped honeycomb formed bodies before firing prepared in the step A, a step B of measuring two or more parameters, which are measurable by observing at least one of the first end surface or the second end surface, for 90% or more of the polygonal cells excluding partial cells at the outermost periphery, and calculating two or more statistics for each parameter measured;

a step C of firing each of the plurality of pillar-shaped honeycomb formed bodies before firing prepared in the step A under predetermined conditions to prepare a plurality of pillar-shaped honeycomb formed bodies after firing;

a step D of evaluating a correlation between the two or more statistics calculated in the step B for each parameter and the strength of the plurality of pillar-shaped honeycomb formed bodies after firing prepared in the step C; and a step E of determining a statistic having the highest correlation with the strength of the pillar-shaped honeycomb formed bodies after firing having the predetermined design specifications from among the two or more statistics based on a result of the step D.

2. The method according to claim 1, wherein the two or more parameters are two or more parameters selected from one or more parameters characterizing a shape or size of opening portion of each polygonal cell, one or more parameters characterizing a shape or size of partition wall portion defining each side of each polygonal cell, and one or more parameters characterizing a shape or size of partition wall portion defining each corner of each polygonal cell.

3. The method according to claim 2, wherein the one or more parameters characterizing the shape or size of the opening portion of each polygonal cell comprise one or more selected from opening area, inscribed circle radius, short side of approximate rectangle, long side of approximate rectangle, rectangularity, circularity, compactness, contour length, convexity degree, ratio of major axis to minor axis, ellipticity, structure factor, center distance deviation, roundness degree, circumscribed circle radius, major axis of approximate ellipse, minor axis of approximate ellipse, cell direction, and ratio of short side to long side;

the one or more parameters characterizing the shape or size of the partition wall portion defining each side of each polygonal cell comprise one or more selected from partition wall curvature, partition wall thickness, and partition wall direction; and the one or more parameters characterizing the shape or size of the partition wall portion defining each corner of each polygonal cell comprise area of the partition wall portion defining the corner.

4. The method according to claim 1, wherein the two or more parameters are ten or more parameters.

5. The method according to claim 1, wherein the two or more statistics are five or more statistics.

6. The method according to claim 1, wherein the two or more statistics include two or more selected from arithmetic mean, standard deviation, kurtosis, skewness, minimum value, median value, and maximum value.

7. The method according to claim 1, wherein the strength is isostatic breaking strength.

8. A method for predicting whether or not a pillar-shaped honeycomb body after firing having predetermined design specifications can be obtained when firing a pillar-shaped honeycomb formed body before firing under predetermined firing conditions based on a measurement result of the pillar-shaped honeycomb formed body before firing, the pillar-shaped honeycomb formed body before firing comprising a pillar-shaped honeycomb structure portion having an outer peripheral side wall and partition walls disposed on an inner peripheral side of the outer peripheral side wall and partitioning a plurality of polygonal cells forming flow paths from a first end surface to a second end surface, the method comprising:

for 90% or more of the polygonal cells excluding partial cells at an outermost periphery, a step 1 of measuring one or more parameters selected from structure factor, cell direction and ratio of short side to long side characterizing a shape of opening portion, and area of partition wall portion defining corner, by observing at least one of the first end surface and the second end surface of the pillar-shaped honeycomb formed body before firing;

based on a result of the step 1, a step 2 of calculating:

if the parameter measured in the step 1 is the structure factor, one or more statistics selected from arithmetic mean and median value, if the parameter measured in the step 1 is the cell direction, one or more statistics selected from standard deviation and kurtosis, if the parameter measured in the step 1 is the ratio of short side to long side, one or more statistics selected from the arithmetic mean, standard deviation and maximum value, if the parameter measured in the step 1 is the area of partition wall portion defining corner, one or more statistics selected from kurtosis and skewness; and a step 3 of comparing the one or more statistics calculated in the step 2 with a predetermined judgment criterion according to the predetermined design specifications and a type of the statistics.

9. The method according to claim 8, comprising a step 4 of estimating a strength of a pillar-shaped honeycomb formed body after the pillar-shaped honeycomb formed body before firing is fired under the predetermined firing conditions based on the one or more statistics calculated in the step 2, by utilizing a correlation between the one or more statistics for the pillar-shaped honeycomb formed body before firing and a strength of a plurality of other pillar-shaped honeycomb formed bodies fired under the predetermined firing conditions, wherein the correlation has been obtained in advance for the plurality of other pillar-shaped honeycomb formed bodies having same design specifications as the pillar-shaped honeycomb formed body to be estimated.

10. The method of claim 9, wherein the strength is isostatic breaking strength.

* * * * *